(12) United States Patent
Takeda et al.

(10) Patent No.: US 6,930,739 B2
(45) Date of Patent: Aug. 16, 2005

(54) LIQUID CRYSTAL DEVICE

(75) Inventors: Arihiro Takeda, Kawasaki (JP); Hideo Chida, Kawasaki (JP); Takahiro Sasaki, Kawasaki (JP); Kimiaki Nakamura, Kawasaki (JP); Yoshio Koike, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 198 days.

(21) Appl. No.: 09/778,627

(22) Filed: Feb. 7, 2001

(65) Prior Publication Data

US 2001/0020992 A1 Sep. 13, 2001

(30) Foreign Application Priority Data

Mar. 6, 2000 (JP) .......................................... 2000-060200

(51) Int. Cl.⁷ ............................................. G02F 1/1337
(52) U.S. Cl. ....................................... 349/129; 349/130
(58) Field of Search ................................. 349/129, 130, 349/123, 139, 143

(56) References Cited

U.S. PATENT DOCUMENTS

| | | | | |
|---|---|---|---|---|
| 5,608,556 A | * | 3/1997 | Koma | 349/143 |
| 6,067,141 A | * | 5/2000 | Yamada et al. | 349/129 |
| 6,342,938 B1 | * | 1/2002 | Song et al. | 349/143 |
| 6,369,870 B1 | * | 4/2002 | Koma | 349/130 |
| 6,630,975 B1 | * | 10/2003 | Terashita | 349/139 |

FOREIGN PATENT DOCUMENTS

| | | |
|---|---|---|
| JP | 08-292423 | 11/1996 |
| JP | 11-194343 | 7/1999 |
| JP | 11-242225 | 9/1999 |

OTHER PUBLICATIONS

Konovalov et al., 44.2L: Multi–Domain Vertically Aligned Mode, 1998, (4pgs).
Konovalov et al., 21–3: Mechanism and Electrooptic Properties of Multi–domain Vertically Aligned Mode, (4pgs).
Kim et al., 21.4: Domain Divided Vertical Alignment Mode with Optimized Fringe Field Effect, (5pgs).

* cited by examiner

Primary Examiner—Robert H. Kim
Assistant Examiner—David Chung
(74) Attorney, Agent, or Firm—Greer, Burns & Crain, Ltd.

(57) ABSTRACT

The present invention relates to a liquid crystal display in multiple alignment or MVA mode in which liquid crystal molecules having negative dielectric anisotropy are aligned differently, and it is an object of the invention to provide a liquid crystal display having improved response characteristics while suppressing any reduction in transmittance. In a liquid crystal display having an electrode formed on each of opposite surfaces of two substrates facing each other with a predetermined gap therebetween, vertical alignment films 2 and 4 formed on the electrodes and liquid crystal molecules 6 having negative dielectric anisotropy sealed between the two substrates, there is provided singular point control portions 10a through 10d and 8 for controlling singular points (+1 or −1) of an alignment vector field of the liquid crystal molecules 6 such that they are formed in predetermined positions when a voltage is applied between the electrodes and for thereby controlling the alignment of the liquid crystal molecules 6 based on the singular point thus formed.

6 Claims, 32 Drawing Sheets

LIQUID CRYSTAL DEVICE

BACKGROUND OF THE INVENTION

1. Field of the Invention

The present invention relates to a liquid crystal display (LCD) and, more particularly, to a liquid crystal display in multiple alignment or MVA (multi-domain vertical alignment) mode in which liquid crystal molecules having negative dielectric anisotropy are aligned differently.

2. Description of the Related Art

Among a variety of flat panel displays, LCDs are regarded most promising displays that can replace CRTs. Further expansion of the market of LCDs is expected as a result of the application of them not only to display monitors of PCs (personal computers), word processors and office automation equipment but also to display units of consumer (home) electric apparatuses such as wide screen televisions and portable small televisions.

Presently, the most frequently used mode of display of LCDs is the normally white mode utilizing TN (twisted nematic) liquid crystals. Such an LCD has an electrode formed on each of surfaces of two glass substrate opposite to each other and horizontal alignment films formed on both of the electrodes. An alignment treatment is performed on the two horizontal alignment films in directions orthogonal to each other by means of rubbing or the like. On the outer surface of each of the substrates, there is provided a polarizer whose polarizing axis is aligned with the rubbing direction of the alignment film on the inner surface of the respective substrate.

When nematic liquid crystals having positive dielectric anisotropy are sealed between the substrates, liquid crystal molecules in contact with the alignment film are aligned in the rubbing direction. That is, the direction of alignment of the liquid crystal molecules in contact with the two alignment films are orthogonal to each other. As a result, the liquid crystal molecules between the two substrates are aligned in a direction perpendicular to the surfaces of the substrates with their directions of alignment sequentially rotated in planes in parallel with the substrate surfaces, and the liquid crystals are twisted between the substrate at an angle of 90 deg.

When light impinges upon the surface of one of the substrates of a TN-type LCD having the above-described structure, the polarizing direction of linearly polarized light which has passed through the polarizer on the substrate is rotated at an angle of 90 deg. along the twist of the liquid crystal molecules when it passes through the liquid crystal layer, and the light then passes through the polarizer on the other substrate which has a polarizing axis orthogonal to the polarizer on the first substrate. This makes it possible to provide display in a bright state when no voltage is applied (normally white mode).

When a voltage is applied between the electrodes opposite to each other, the twist is eliminated because the longitudinal axes of the nematic liquid crystal molecules having positive dielectric anisotropy are aligned in a direction perpendicular to the substrate surfaces. The liquid crystal molecules do not exhibit birefringence (birefringent anisotropy) against linearly polarized light incident upon the liquid crystal layer in such a state. Therefore, the incident light can not pass through the other polarizer because its polarizing direction is not changed. This makes it possible to provide display in a dark state when a predetermined maximum voltage is applied. By removing the voltage, the display can be returned to the bright state because of an aligning force. The inclination of the liquid crystal molecules can be controlled by varying the applied voltage to vary the intensity of light transmitted by the other polarizer, which makes it possible to perform gray-scale display.

Active matrix type TN TFT LCDs in which a TFT (thin film transistor) as a switching element for controlling a voltage applied between opposite electrodes is provided at each pixel are widely used in display monitors for PCs and portable televisions because of their low profiles, light weights and capability of allowing wide screens with high image quality. Techniques for manufacturing TN-type TFT LCDs have advanced dramatically in recent years, and they have become better than CRTs in terms of contrast and color reproducibility as viewed in front of the screen. However, TN-type TFT LCDs have a serious problem in that their viewing angles are small. In particular, the viewing angles are small in the vertical panel viewing directions. In one of the viewing direction, luminance in the dark state increases to show an image that is undesirably whitish. In the other direction, the display becomes too dark in general, and luminance inversion of an image occurs in halftones. This is the most serious problem of TN-type LCDs.

An LCD which has solved such a problem in the viewing angle characteristics of TN-type LCDs is the MVA-LCD disclosed in Japanese patent No. 2947350. Referring now to an example of the MVA-LCD, an electrode is first formed on each of opposite surfaces of two substrates facing each other at a predetermined interval. Vertical alignment films are formed on both of the electrodes, and liquid crystals having negative dielectric anisotropy are sealed between the two vertical alignment films. A plurality of linear protrusions made of an insulator are periodically formed between the electrodes on the substrates and the vertical alignment films. The linear protrusions facing each other between the two substrates are offset from each other by an amount equivalent to one half of their pitch as viewed in the normal direction of the substrate surfaces. The linear protrusions are used for alignment control to separate liquid crystals in a pixel region in a plurality of directions of alignment. The separation of alignment can be also achieved by providing slits on the electrodes instead of the linear protrusions.

Two polarizers whose polarizing axes are orthogonal to each other are provided on the outer surfaces of the two substrates. The mounting direction of the polarizers is adjusted such that the direction of the longitudinal axes of liquid crystal molecules which are tilted on the display surface of the substrates in response to application of a voltage are substantially at an angle of 45 deg. to the polarizing directions of the polarizers as viewed in the normal direction of the substrate surfaces.

When nematic liquid crystals having negative dielectric anisotopic properties are sealed between the substrates, the longitudinal axes of the liquid crystals are aligned in a direction perpendicular to the surface of the vertical alinment layers. As a result, liquid crystal molecules on the substrate surfaces are aligned perpendicularly, and liquid crystal molecules on tilted surfaces of the linear protrusions are aligned at an angle to the substrate surfaces.

When light impinges upon one of the substrates with no voltage applied between the two electrodes of the MVA-LCD having the above-described structure, linearly polarized light that has passed through the one of the polarizers to enter the liquid crystal layer travels along the longitudinal axes of the perpendicularly aligned liquid crystal molecules.

The incident light travels with no change in the polarizing direction because no birefringence occurs in the direction of the longitudinal axes of the liquid crystal molecules and are absorbed by the other polarizer which has a polarizing axis orthogonal to the first polarizer. This makes it possible to provide display in the dark state (normally black mode) when no voltage is applied.

When a voltage is applied between the opposite electrodes, the longitudinal axes of the liquid crystal molecules are aligned in parallel with the substrate surfaces with the direction of alignment of the liquid crystal molecules on the substrate surfaces regulated in accordance with the direction of alignment of the liquid crystal molecules which are tilted in advance by the linear protrusions.

The liquid crystal molecules exhibit birefringent properties against light which enters the liquid crystal layer in this state, and the polarization of the incident light changes in accordance with the inclination of the liquid crystal molecules. Light which passes through the liquid crystal layer while the application of a predetermined maximum voltage becomes linearly polarized light with a polarizing direction rotated, for example, at an angle of 90 deg, and it can therefore be transmitted by the other polarizer to provide display in the bright state. The display can be returned to the dark state by an action of an aligning force, when the voltage is removed. The inclination of the liquid crystal molecules can be controlled by varying the applied voltage to vary the intensity of the light transmitted by the second polarizer, which makes it possible to perform gray-scale display.

In an active matrix type MVA TFT LCD having a TFT formed at each pixel, the direction of alignment of the liquid crystals in a pixel can be separated into a plurality of direction. This makes it possible to achieve a quite large viewing angle and high contrast compared to those of TN-type TFT LCDs. Since no rubbing process is required, the manufacturing steps can be simplified with an increase in the yield of manufacture.

However, conventional MVA type TFT LCDs are still to be improved in terms of the response time of display. Specifically, although they can achieve a high speed response when display is turned to black again after a change from black display to white display, they are somewhat inferior to TN-type TFT LCDs in terms of response time during a change from a certain halftone to another halftone.

Further, conventional MVA type TFT LCDs have optical transmittance which is about twice that of lateral field type IPS (In-plane switching) wide viewing angle LCDs but is not as good as that of TN-type TFT LCDs.

As described above, while MVA TFT LCDs have solved the problems with conventional LCDs in terms of the viewing angle, contrast and response time in displaying black, white and then black again, they are not still as good as conventional TN-type LCDs in terms of response time in displaying halftones and transmittance.

A description will now be made with reference to FIGS. 42A through 43C on reasons why the response of conventional MVA LCDs to halftones is slower than that of conventional TN-type LCDs. FIGS. 42A through 42C show schematic configurations of sections of an MVA LCD panel taken along in a direction perpendicular to the substrate surfaces thereof. FIG. 42A shows the alignment of the liquid crystals when no voltage is applied, and FIG. 42B shows the alignment of the liquid crystals when a voltage is applied. FIG. 42C is a conceptual diagram showing a state of alignment control. FIGS. 43A through 43C show schematic configurations of sections of a TN-type LCD panel taken along a direction perpendicular to the substrate surfaces. FIG. 43A shows the alignment of the liquid crystals when no voltage is applied, and FIG. 43B shows the alignment of the liquid crystals when a voltage is applied. FIG. 43C is a conceptual diagram showing a state of alignment control.

A TN-type LCD 100 will be first described with reference to FIGS. 43A through 43C. As shown in FIG. 43A, liquid crystals 102 of the TN-type LCD 100 are aligned at a twist of 90 deg. between an electrode 108 on an upper substrate 104 and an electrode 110 on a lower substrate 106 provided opposite to each other (alignment films on both of them are not shown) when not voltage is applied. When a voltage is applied between the electrodes 108 and 110, as shown in FIG. 43B, the liquid crystal molecules erect on the substrates 104 and 106 substantially perpendicularly thereto, which removes the twist. When the application of the voltage is stopped, the liquid crystal molecules rotate in a direction substantially in parallel with the surfaces of the substrates 104 and 106 to be in the twisted alignment again. As thus described, in the case of the TN-type LCD 100, it can be thought not only that the alignment of liquid crystal molecules in the vicinity of interfaces of the electrodes 108 and 110 to the alignment films (not shown) is controlled by a regulating force of the alignment films as indicated by the shaded part 112 in FIG. 43C but also that a twisted alignment achieved by adding a chiral agent or the like alignment control is achieved to some degree even on liquid crystal molecules located in the middle of the liquid crystal layer 102.

As shown in FIG. 42A, liquid crystal molecules except those located in the vicinity of linear protrusions 126, 128 and 130 among liquid crystals 124 of an MVA LCD 114 are aligned substantially perpendicularly to substrate surfaces between an electrode 120 on an upper substrate 116 and an electrode 122 on a lower substrate 122 (alignment films on both of the substrates are not shown) which are provided opposite to each other when no voltage is applied. Liquid crystal molecules in the vicinity of the linear protrusions 126 through 130 are aligned substantially perpendicularly to the surfaces of the alignment films which are not shown on inclined surfaces of the protrusions and are inclines relative to the surfaces of the substrates. When a voltage is applied between the electrodes 120 and 122, as shown in FIG. 42B, tilting of liquid crystals sequentially propagates in the tilting direction of the liquid crystal molecules in the vicinity of the linear protrusions 126 through 130 for regulating alignment. As a result, liquid crystal molecules in the middle of the region or gap between one linear protrusion and another linear protrusion arc tilted with a time lag. Especially, the speed of propagation of the tilting of liquid crystal molecules are low in the case of a change from black to a dark halftone because the amount of the change in the applied voltage is small and the change in the strength of electric fields in the liquid crystals is therefore also small.

The tilting directions of the liquid crystal molecules located between the gaps between the linear protrusions 126 through 130 are not defined unless the tilting directions are propagated from the linear protrusions 126 through 130. That is, the alignment of the liquid crystals in the MVA LCD is regulated only by distortion of electric fields in the vicinity of interfaces of the substrate surfaces to the alignment films on which a regulating force of the alignment films acts, on the alignment films on the linear protrusions 126 through 130 and in the vicinity of the same, as indicated by the shaded part 132 in FIG. 42C. The crystal alignment in other regions is controlled only indirectly.

The response time can be shortened even in the conventional MVA structure by reducing the distance of the gaps (pitch) between the linear projections on the upper and lower substrates. As described above, however, the tilting direction of liquid crystals of a normal MVA LCD is defined by inclined surfaces of protrusions made of an insulator. Therefore, the inclined regions must have a certain width, length and height. This places some limit on the reduction of the pitch of the upper and lower protrusions.

FIG. 44 shows the alignment of the liquid crystal molecules in the MVA LCD shown in FIGS. 42A through 42C when a voltage is applied as viewed from the lower substrate 118. The upper and lower protrusions 126 and 128 among the three linear protrusions 126 through 130 extending in the lateral direction of the figure are formed on the lower substrate 118, and the protrusion 130 in the middle is formed on the upper substrate 116.

As shown in FIG. 44, the alignment of the liquid crystal molecules which are aligned substantially perpendicularly to the surfaces of the substrates 116 and 118 when no voltage is applied is separated into an alignment region A in which they are aligned in the direction from the linear protrusion 130 on the upper substrate 116 toward the linear protrusion 128 on the lower substrate 118 (the direction of upwardly leaving the plane of the drawing) and an alignment region B in which they are aligned in the direction from the linear protrusion 130 toward the linear protrusion 126 on the lower substrate 118 (the direction of downwardly leaving the plane of the drawing).

Specifically, when a voltage is applied, alignment separation is performed on the liquid crystal molecules in the alignment regions A and B which are adjacent to each other with the linear protrusion 130 interposed therebetween such that the direction of the longitudinal axes of the liquid crystals in the alignment region A is substantially at an angle of +90 deg. to the linear protrusion 130 and such that the direction of the longitudinal axes of the liquid crystals in the alignment region B is substantially at an angle of −90 deg. to the linear protrusion 130. Liquid crystal molecules in the vicinity of the tops of the linear protrusions 126 through 130 are tilted in the extending direction of the protrusions when a voltage is applied and are aligned in a direction of alignment of about 0 or 180 deg. to (in parallel with) the linear protrusions 126 through 130.

As thus described, when a voltage is applied, the direction of alignment of the liquid crystal molecules in the display regions on the substrates 116 and 118 is rotated at an angle of 90 deg. to the direction of alignment of the liquid crystal molecules in the vicinity of the tops of the linear protrusions 126 through 130 (that is about 0 or 180 deg. to the linear protrusions 126 through 130). Therefore, liquid crystal molecules are arranged on both sides the inclined surfaces of the linear protrusions 126 through 130 in a direction of alignment of 45 deg. to the linear protrusions 126 through 130, as shown in FIG. 44. Meanwhile, the polarizing axes P and A of the polarizers indicated by two arrows orthogonal to each other in the figure are at inclined at 45 deg. relative to the direction of alignment of the liquid crystal molecules in the display regions A and B on the substrates 116 and 118.

Therefore, the direction of alignment of the liquid crystal molecules aligned in the direction of 45 deg. to the linear protrusions 126 through 130 are parallel and perpendicular to the polarizing directions of the polarizing axes P and A of the polarizers, respectively. As a result, two dark lines (disclination lines) 140 and 142 are generated on both sides of the inclined surfaces of the linear protrusions 126 through 130 as indicated by the broken lines in the figure. The two dark lines 140 and 142 are formed each of intervals between first singular points (indicated by (+1) in the figure) and second singular points (indicated by (−1) in the figure) in alignment vector fields formed on the linear protrusions 126 through 130. The longitudinal axes of the liquid crystal molecules are substantially directed toward the same point in the first singular points (+1), and a part of the liquid crystal molecules are aligned in a different direction at the second singular points.

When it is attempted to shorten the response of such a conventional MVA LCD to halftones by reducing the pitch of the upper and lower protrusions to form the protrusions with an increased density, an increase occurs not only in the area occupied by the protrusions in the pixel region but also in the density of the formation of the two dark lines 140 and 142 formed on both sides of the protrusions, which results in a reduction of transmittance at a degree that can not be ignored. Therefore, a problem arises in that a reduction of transmittance occurs when the density of the linear protrusions are formed in an increased density to improve the response characteristics of the liquid crystals. As thus described, the structure of a conventional MVA LCD has a problem in that an improvement of the response characteristics of the liquid crystals and an improvement of transmittance are in the relationship of trade-off.

SUMMARY OF THE INVENTION

It is an object of the invention to provide a liquid crystal display whose response characteristics are improved while suppressing the reduction in transmittance.

The above-described object is achieved by a liquid crystal display having two substrates facing each other with a predetermined gap therebetween, an electrode formed on each of surfaces of the two substrates facing each other, vertical alignment films formed on the electrodes and liquid crystals having negative dielectric anisotropy sealed in the gap, characterized in that it comprises a singular point control portion for performing control such that a singular point of a director of the liquid crystals is formed in a predetermined position when a voltage is applied between the electrodes and in that alignment of the liquid crystals is controlled using at least the singular point thus formed.

Figure 6:
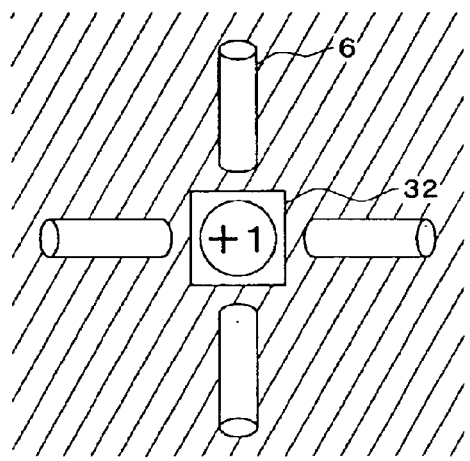
Figure 7:
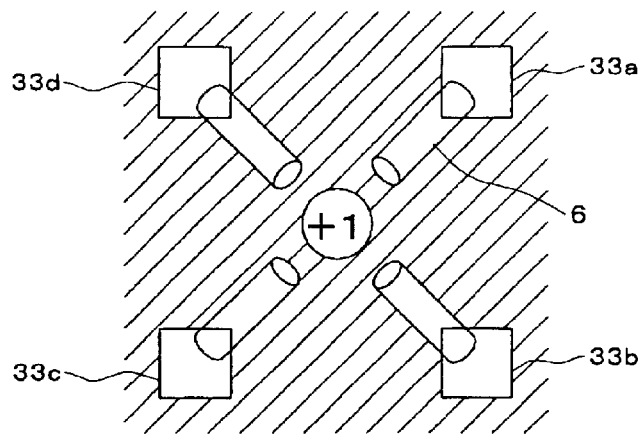
Figure 8:
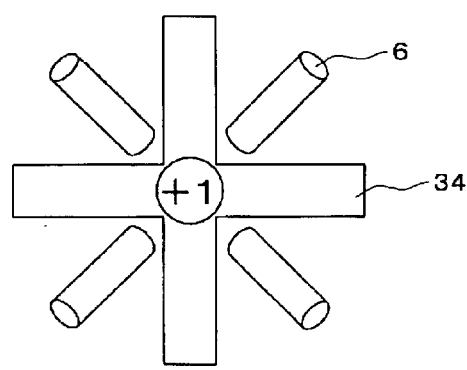
Figure 9:
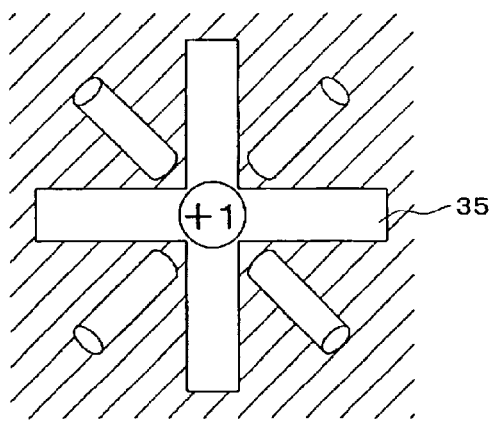
Figure 10:
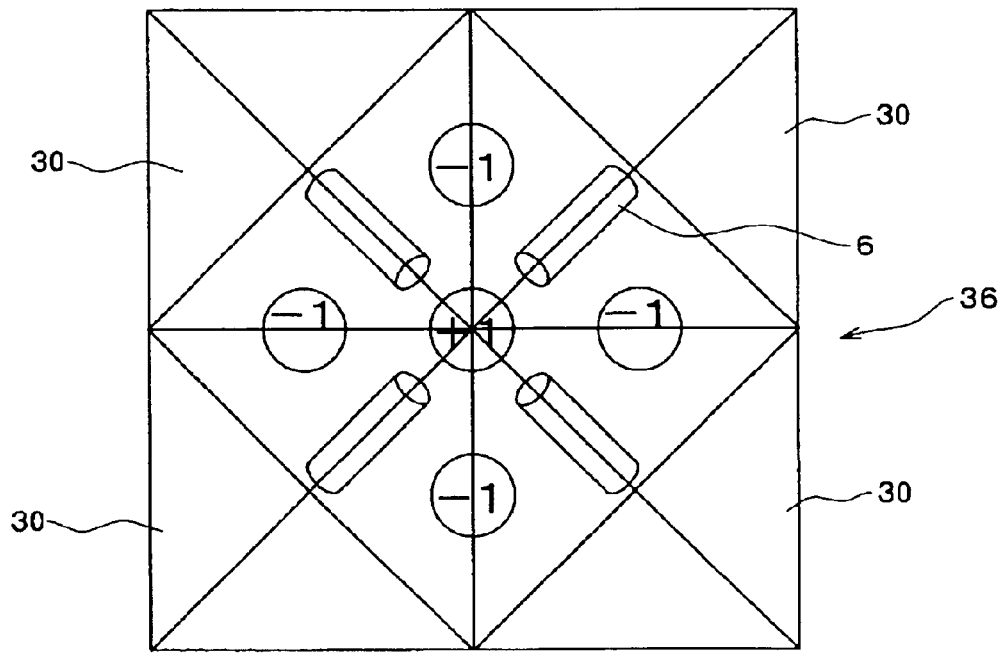
Figure 11:
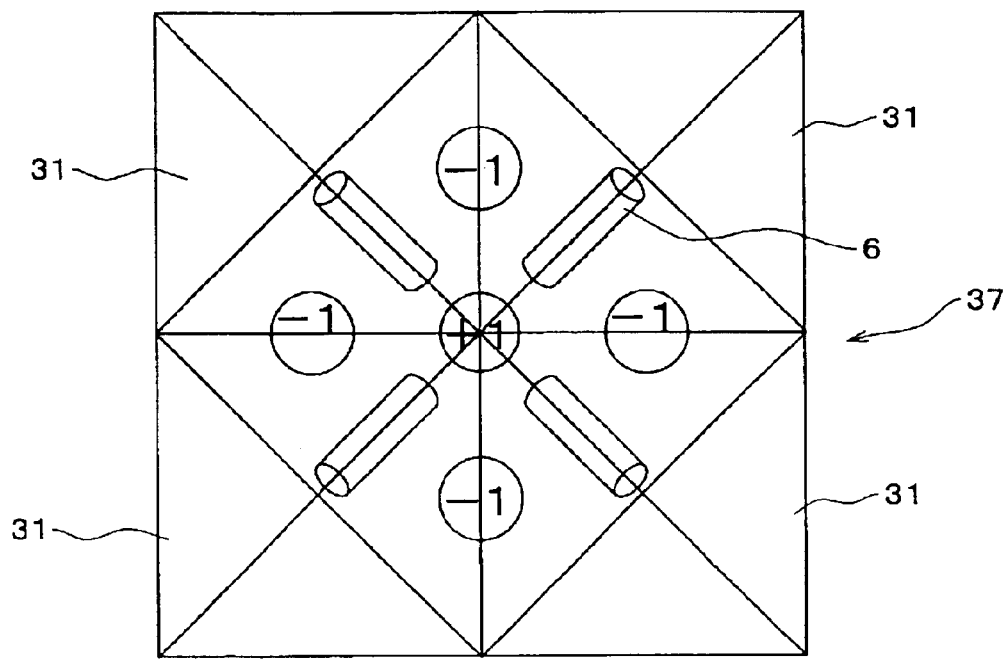
Figure 12:
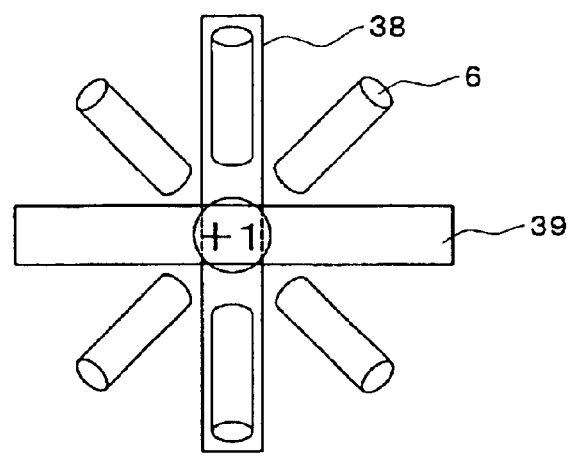
Figure 13:
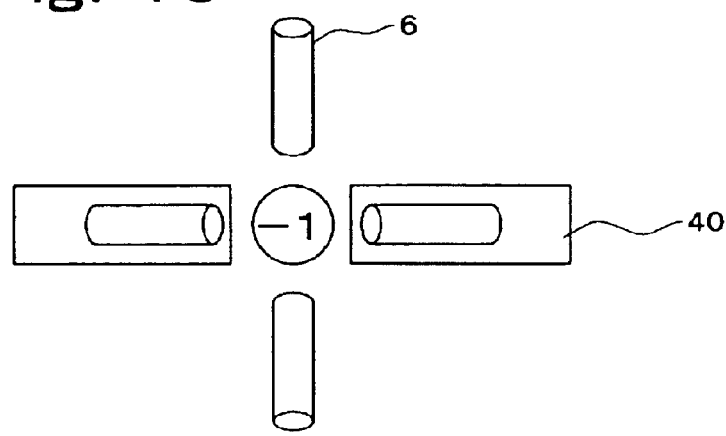
Figure 14:
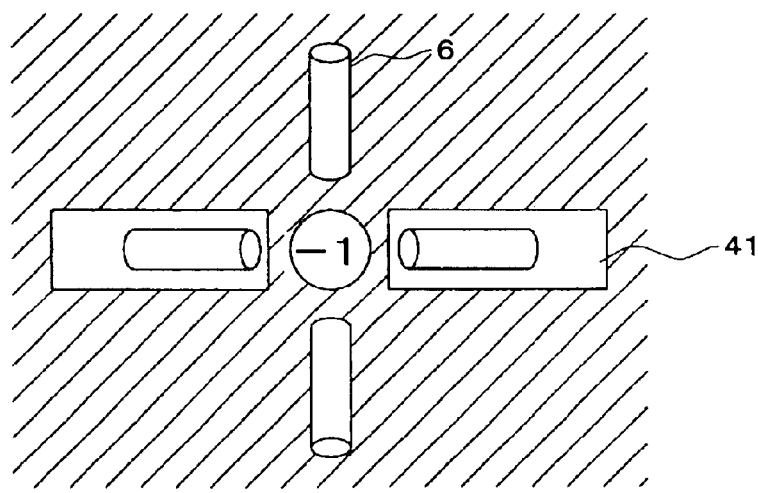
Figure 15:
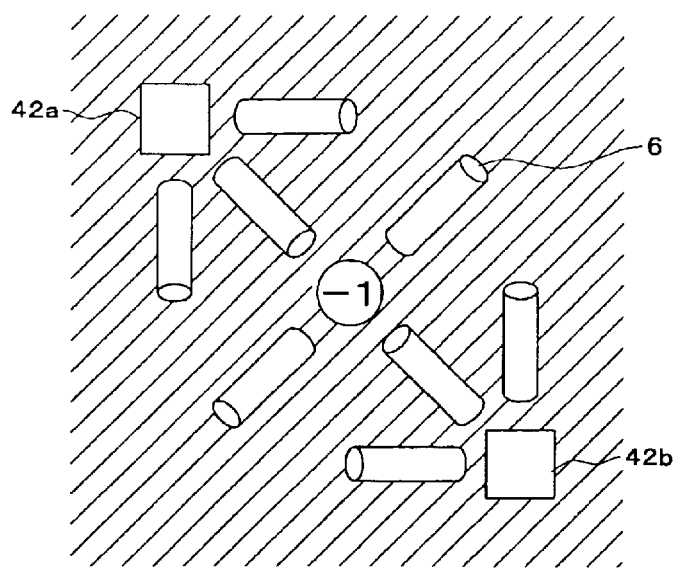
Figure 16:
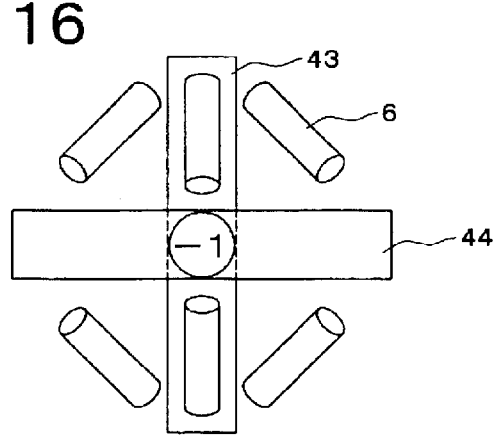
Figure 17:
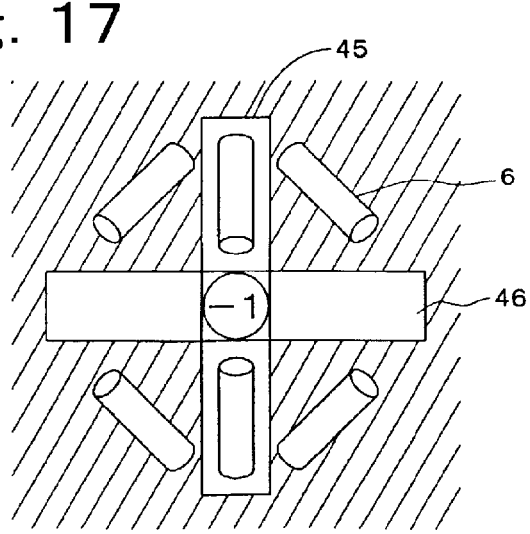
Figure 18:
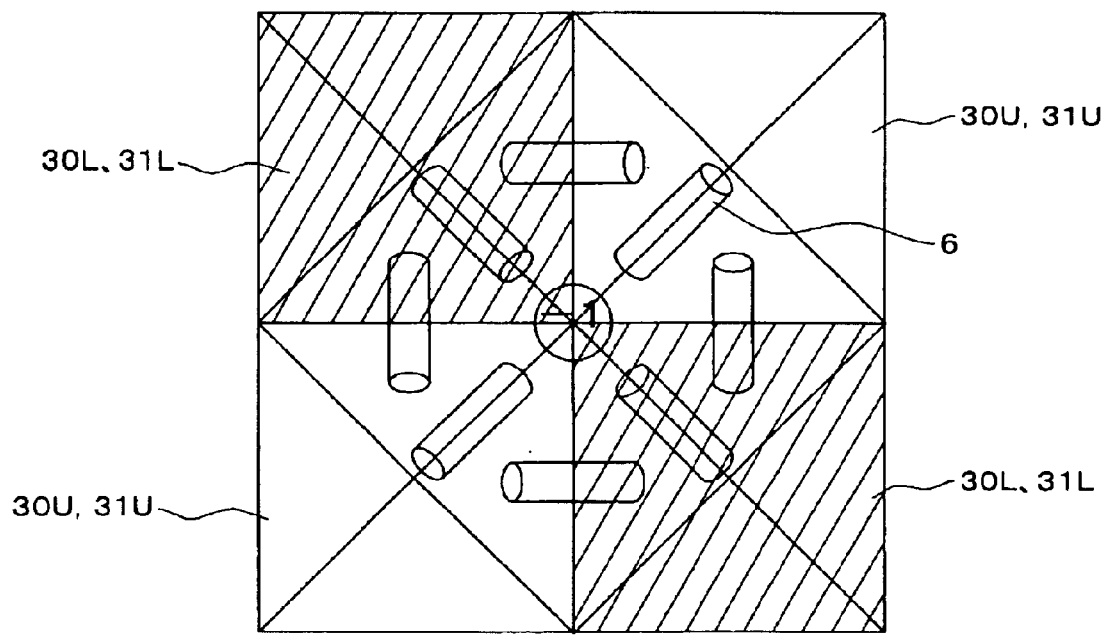
Figure 19:
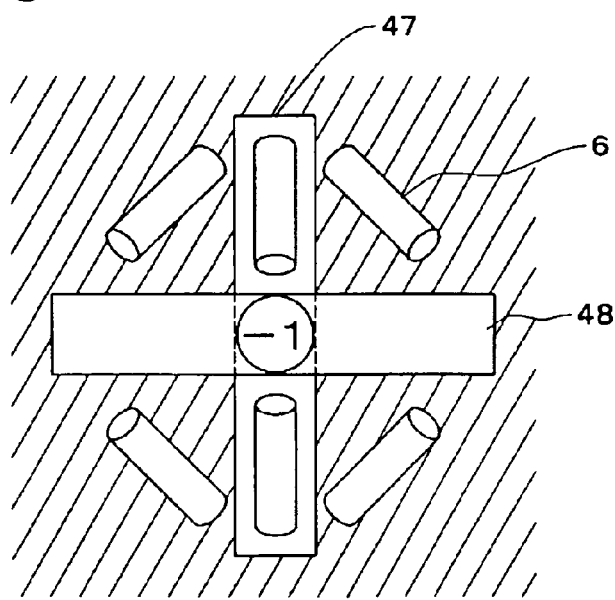
Figure 20A:
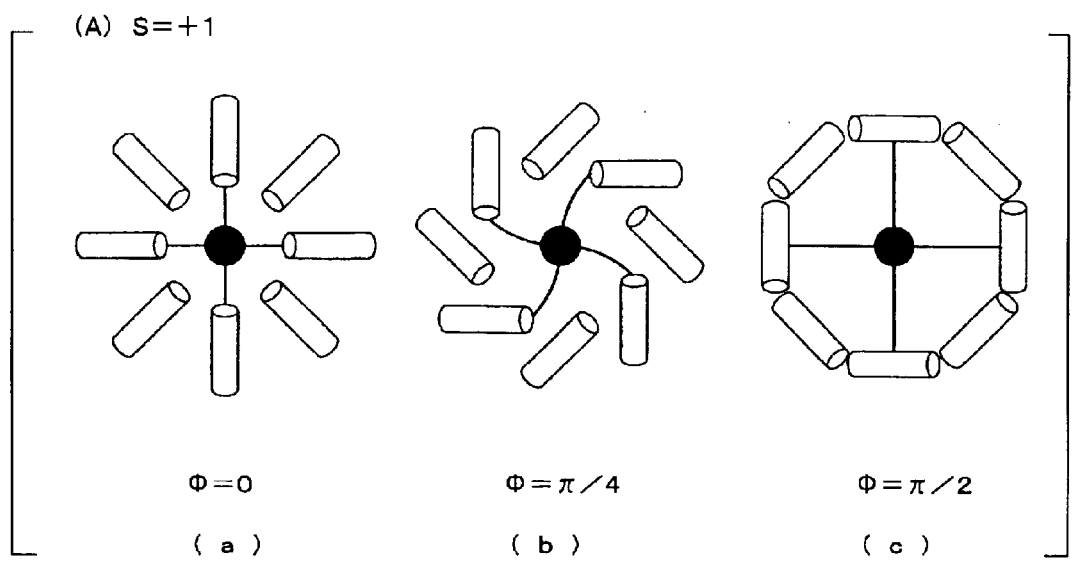
Figure 20B:
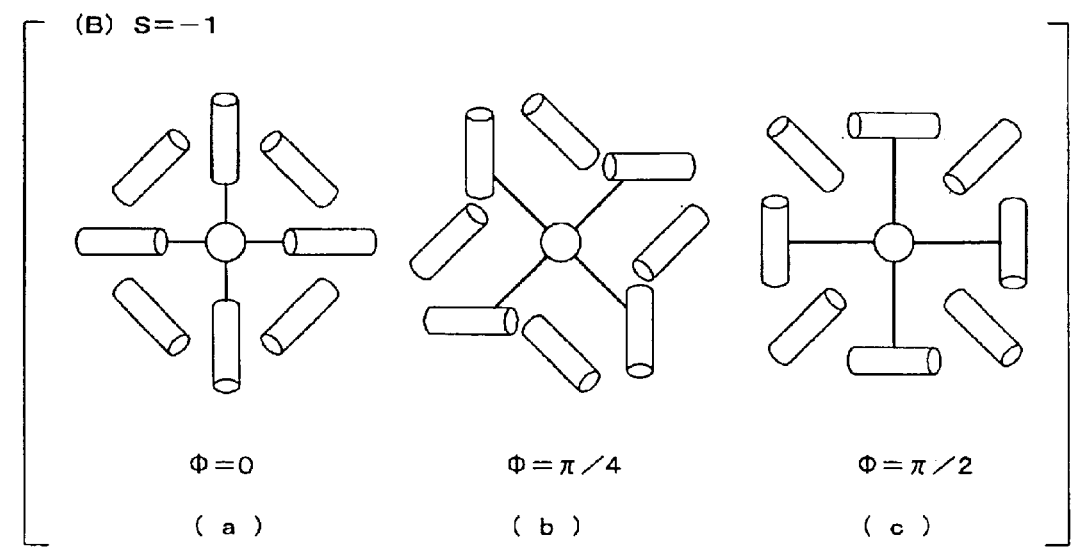
Figure 21:
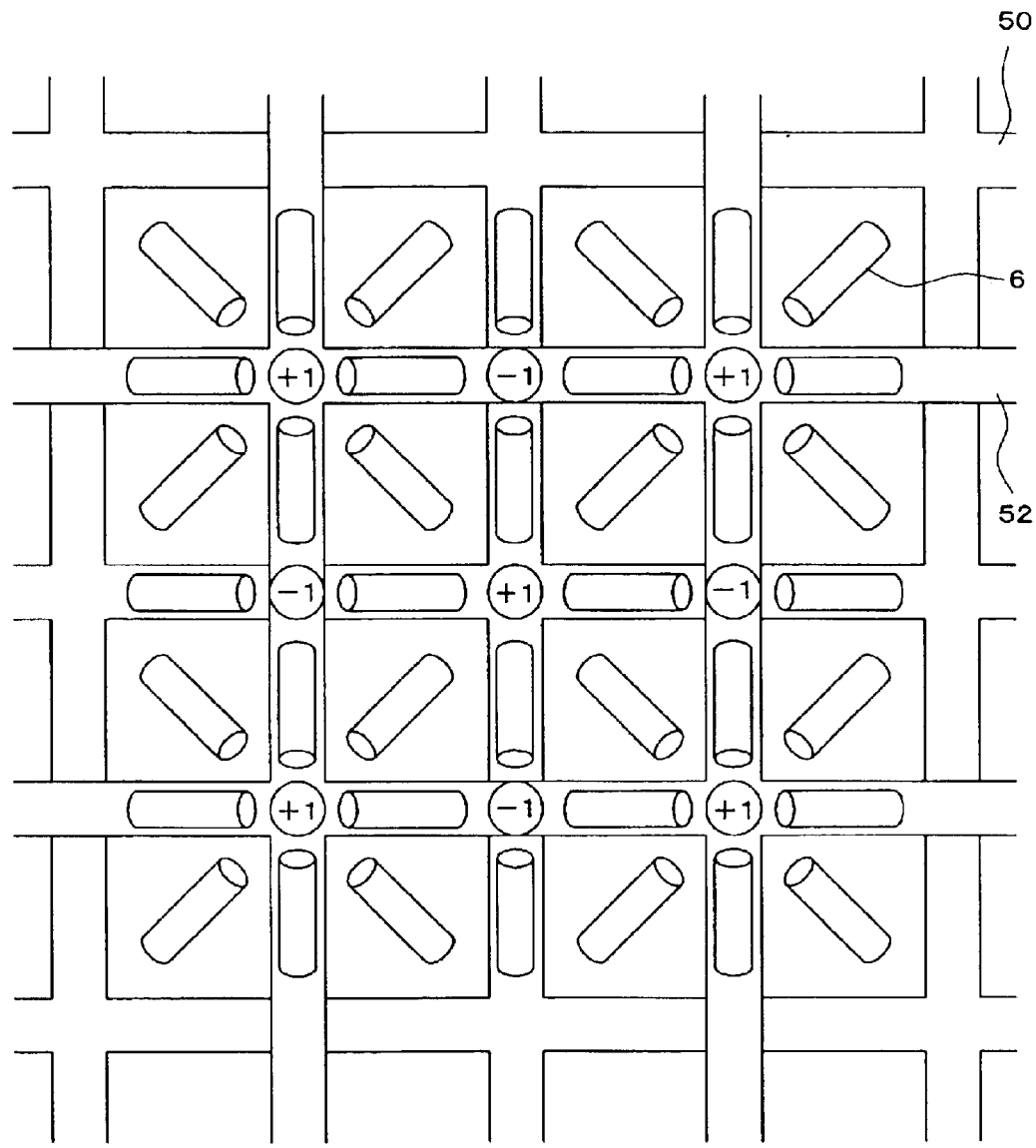
Figure 21:
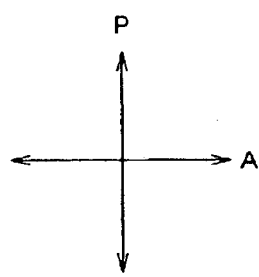
Figure 22:
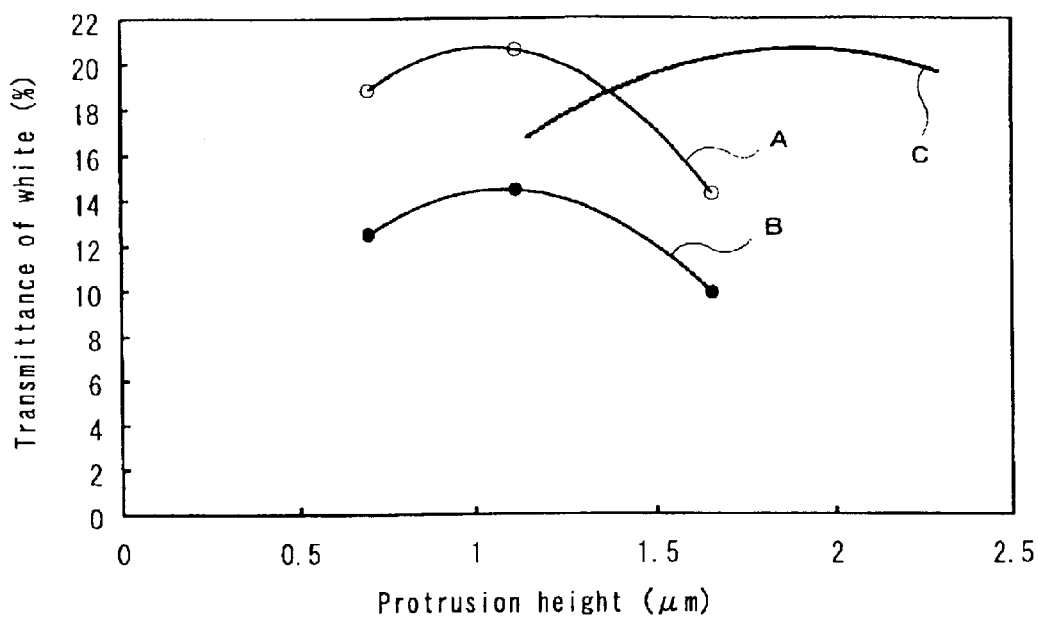
Figure 23:
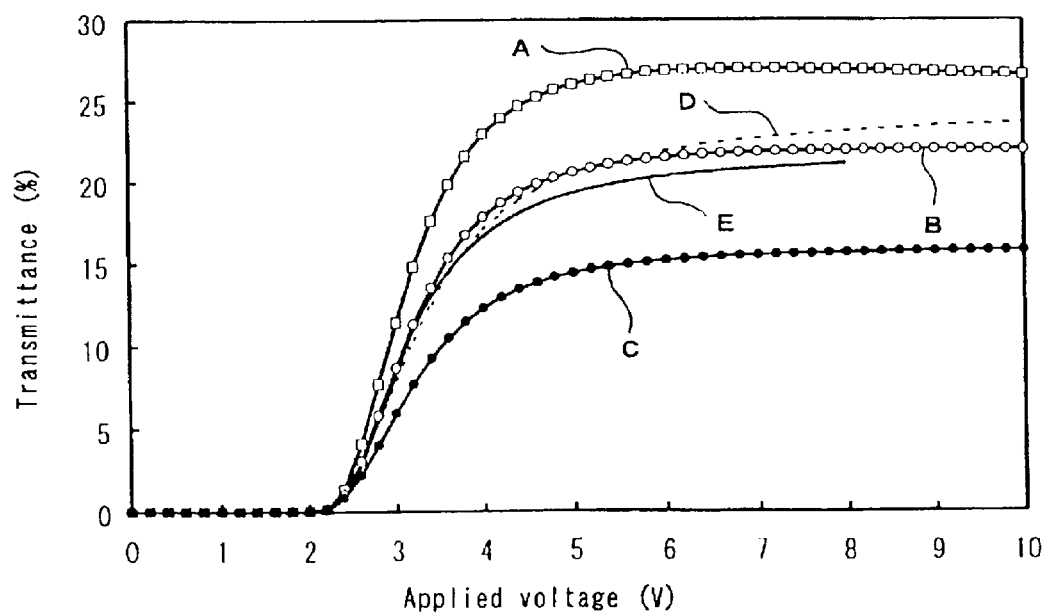
Figure 24:
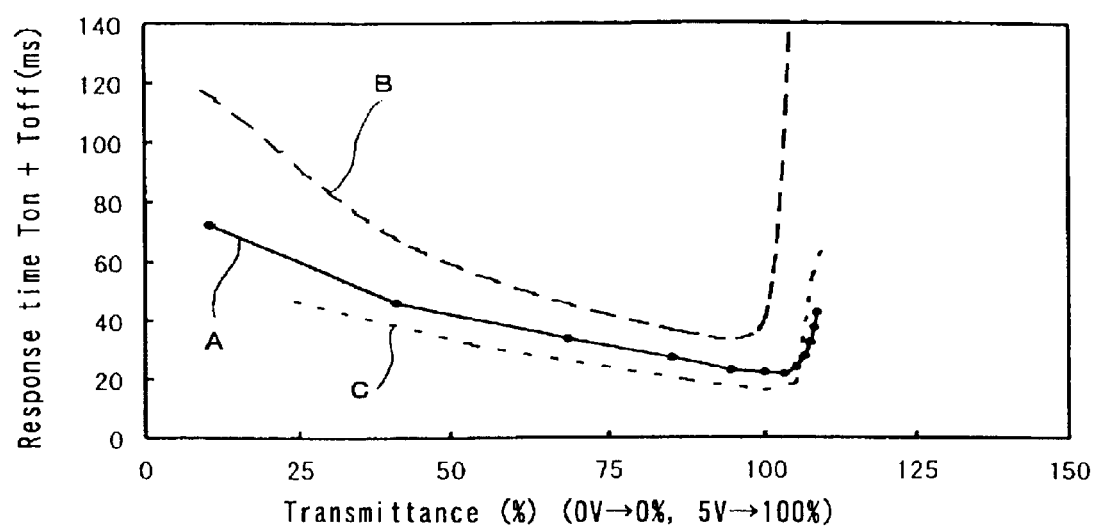
Figure 25:
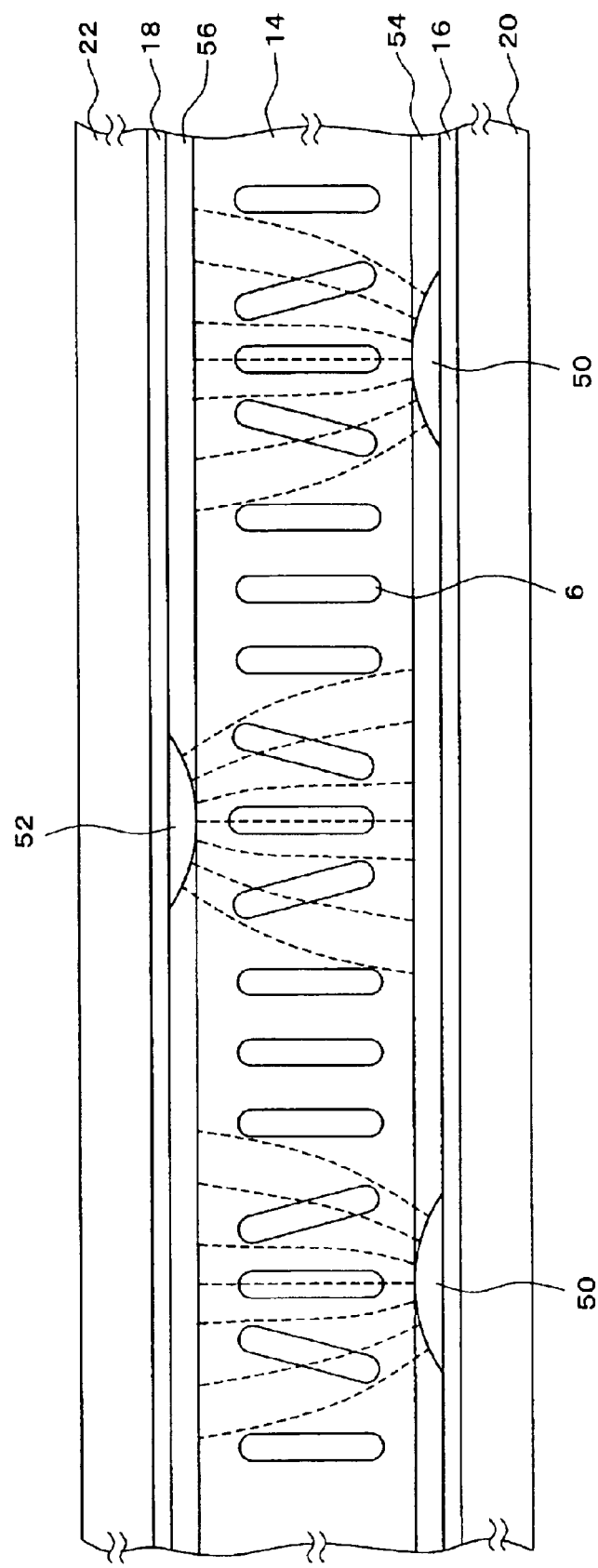
Figure 26:
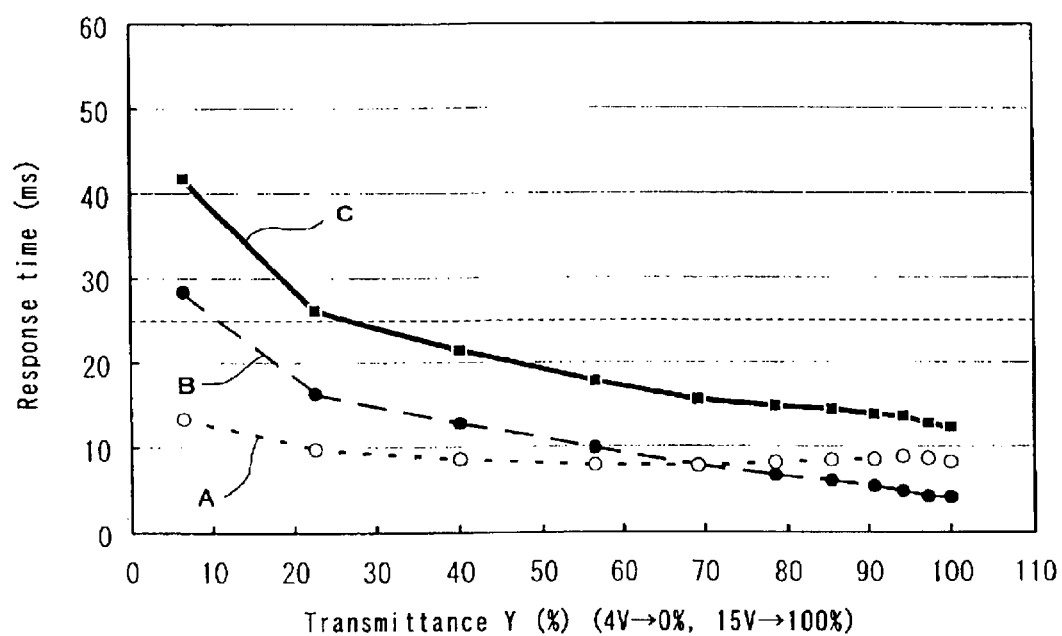
Figure 27:
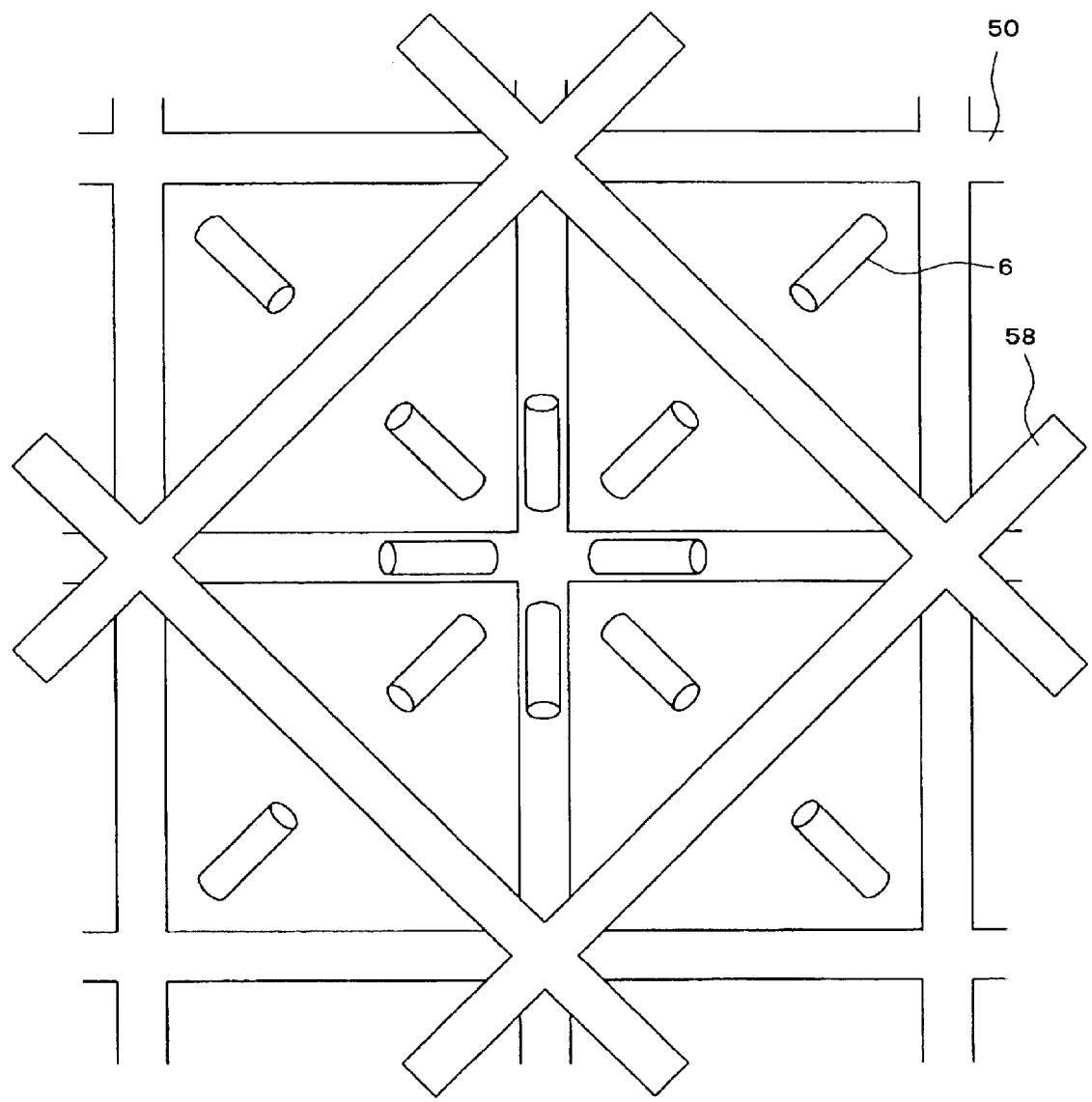
Figure 28:
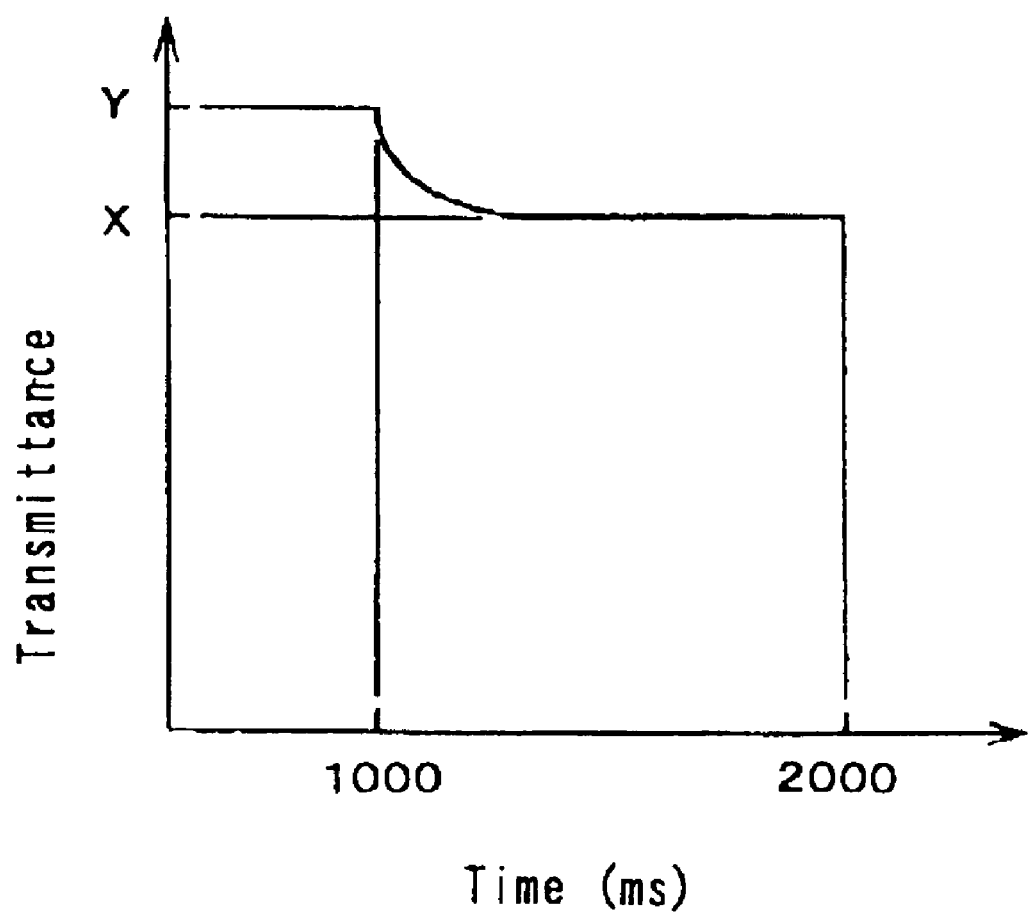
Figure 29A:
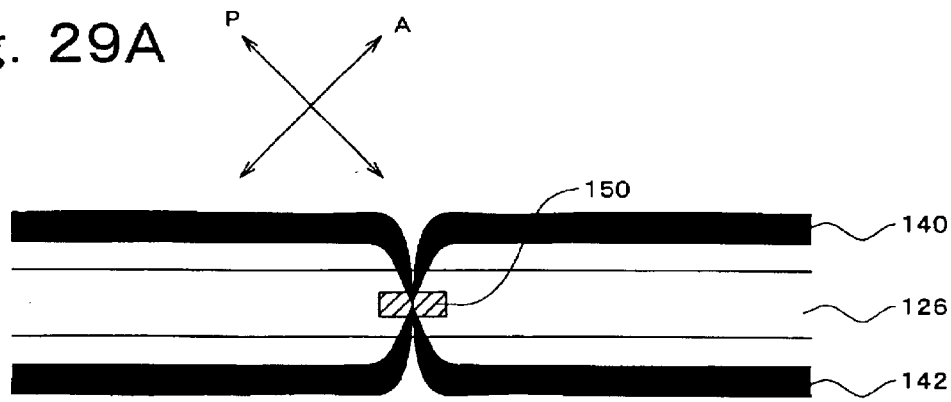
Figure 29B:
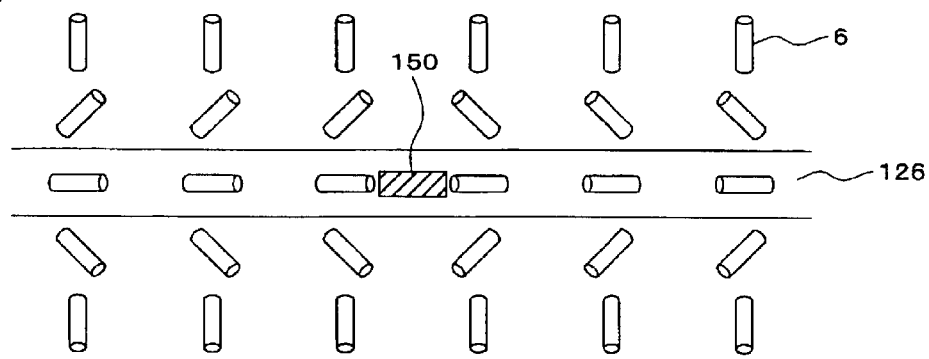
Figure 29C:
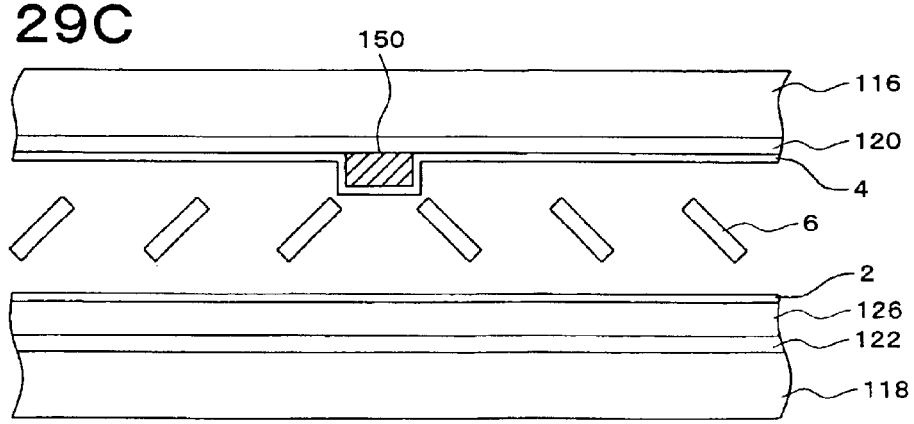
Figure 30:
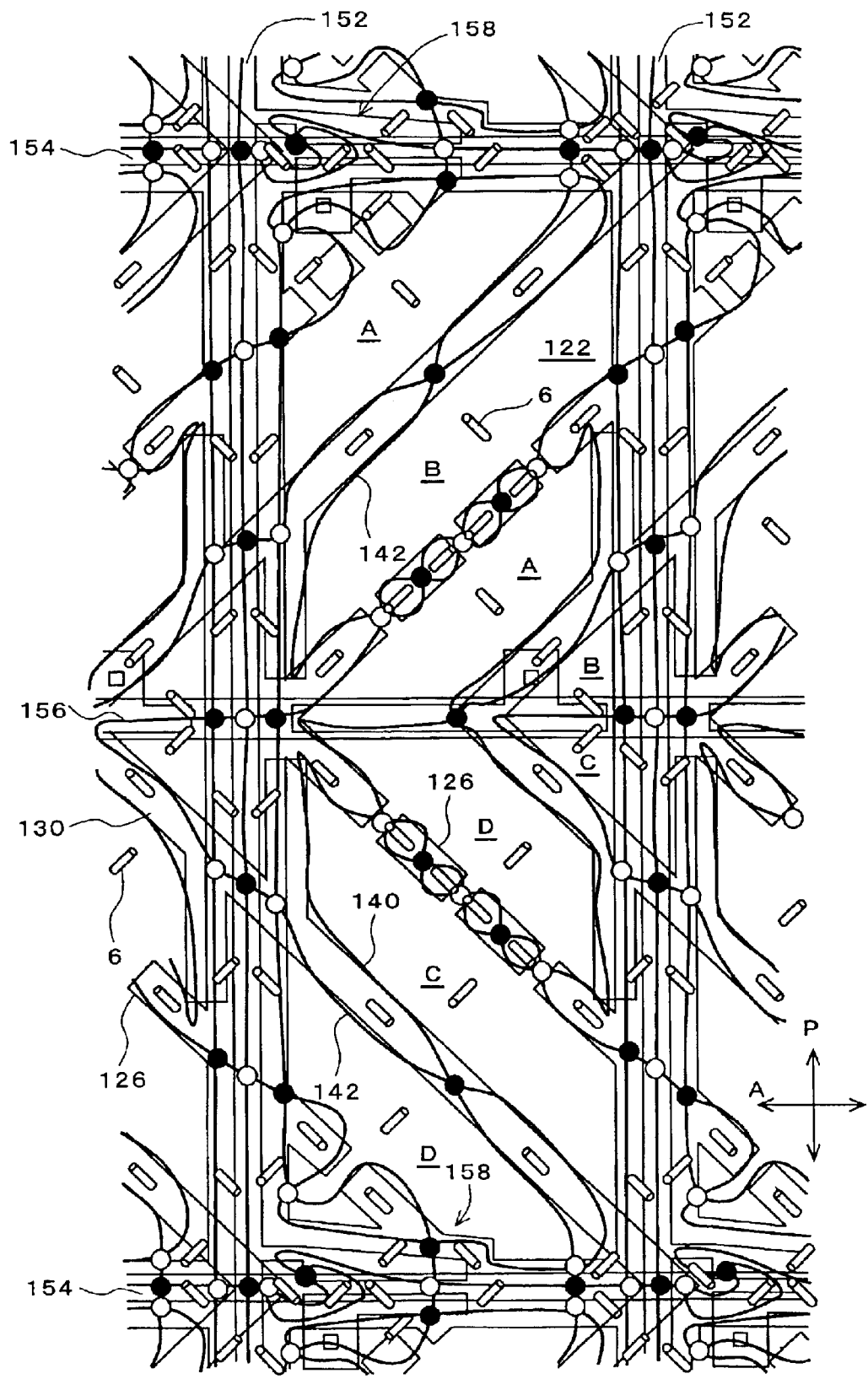
Figure 31:
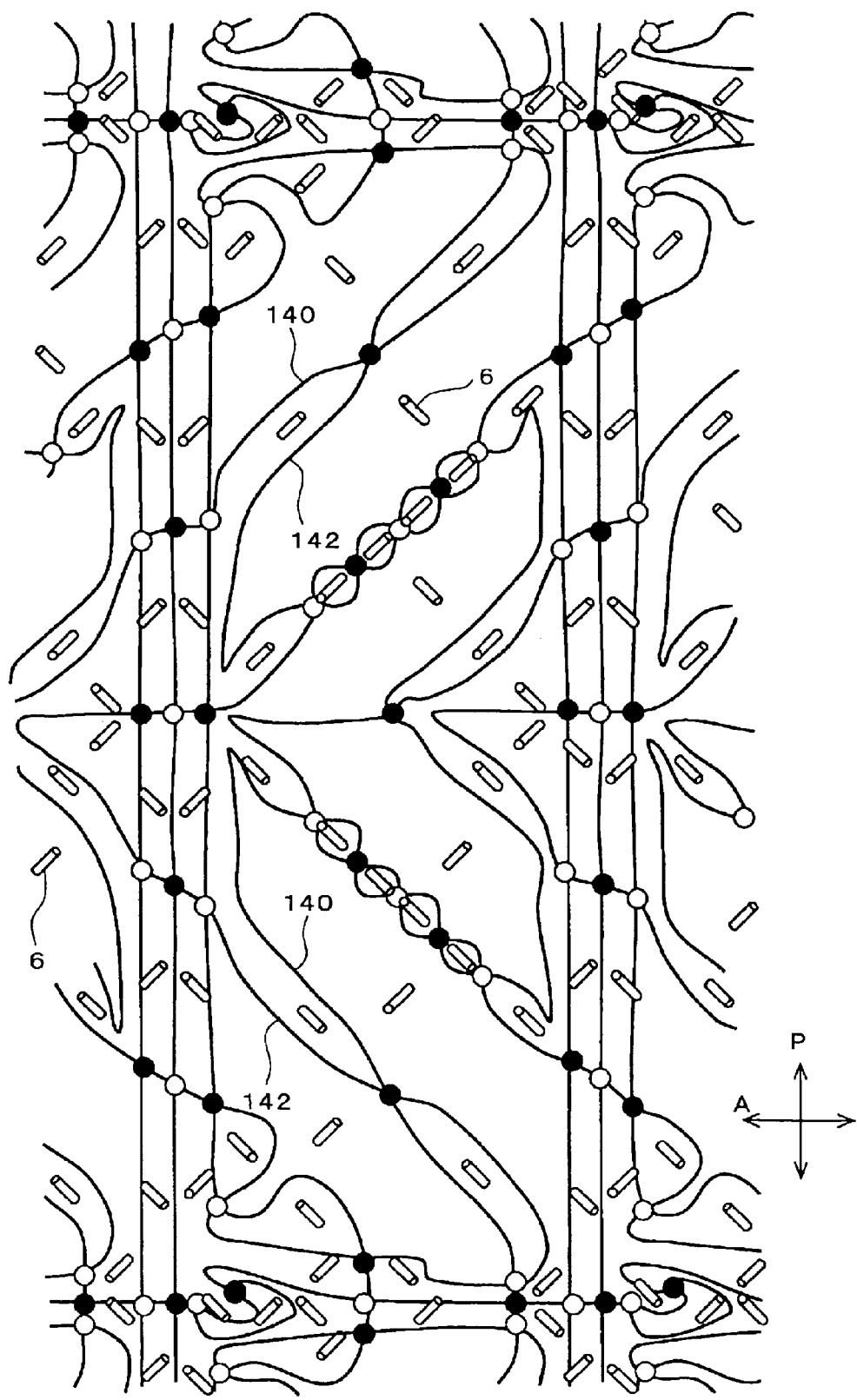
Figure 32A:
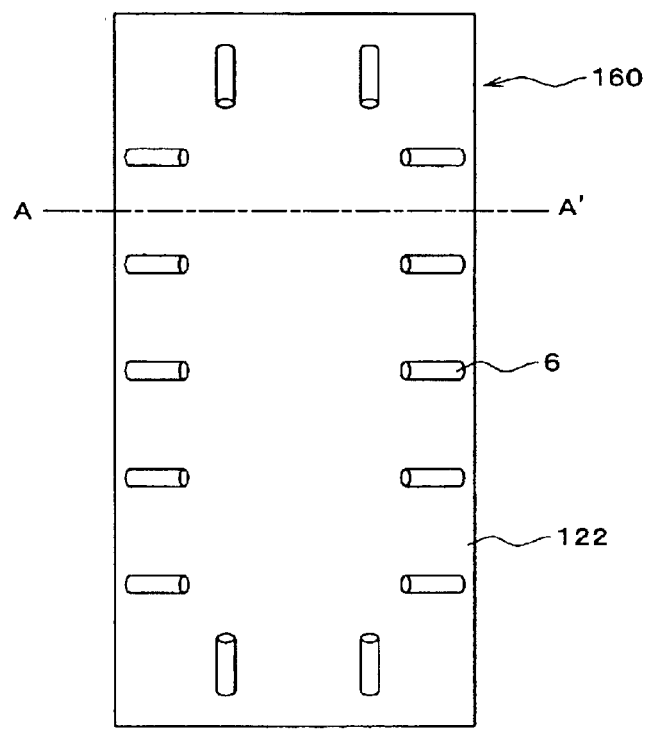
Figure 32B:
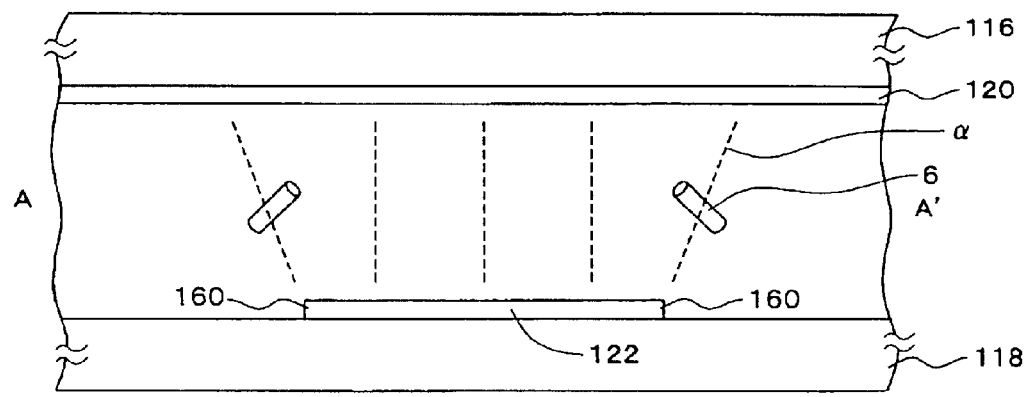
Figure 33A:
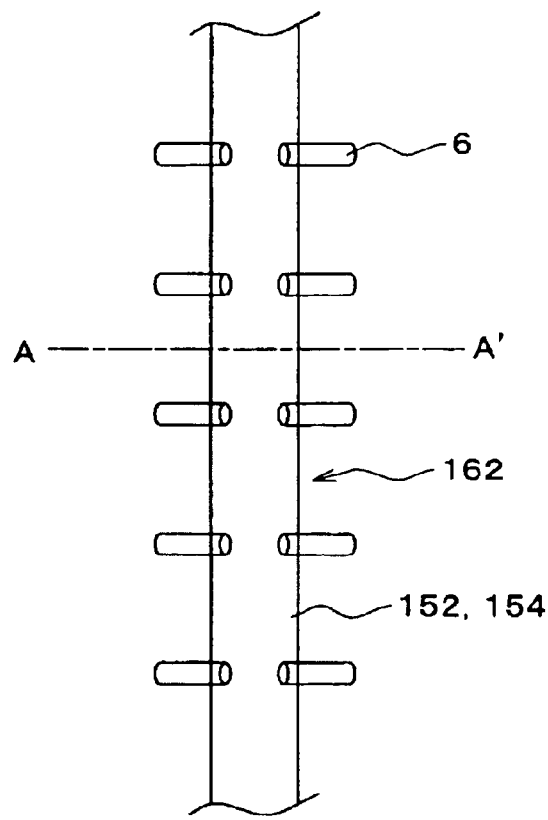
Figure 33B:
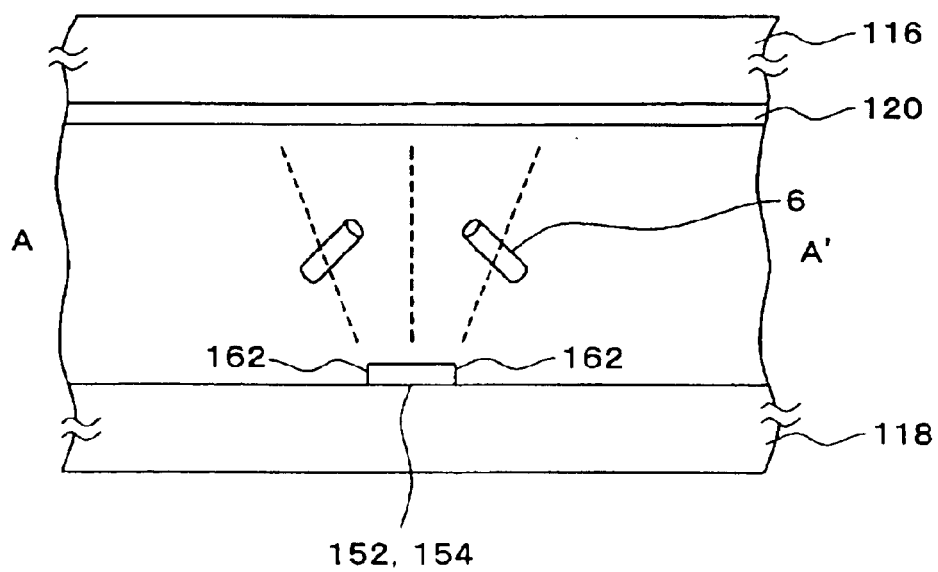
Figure 34:
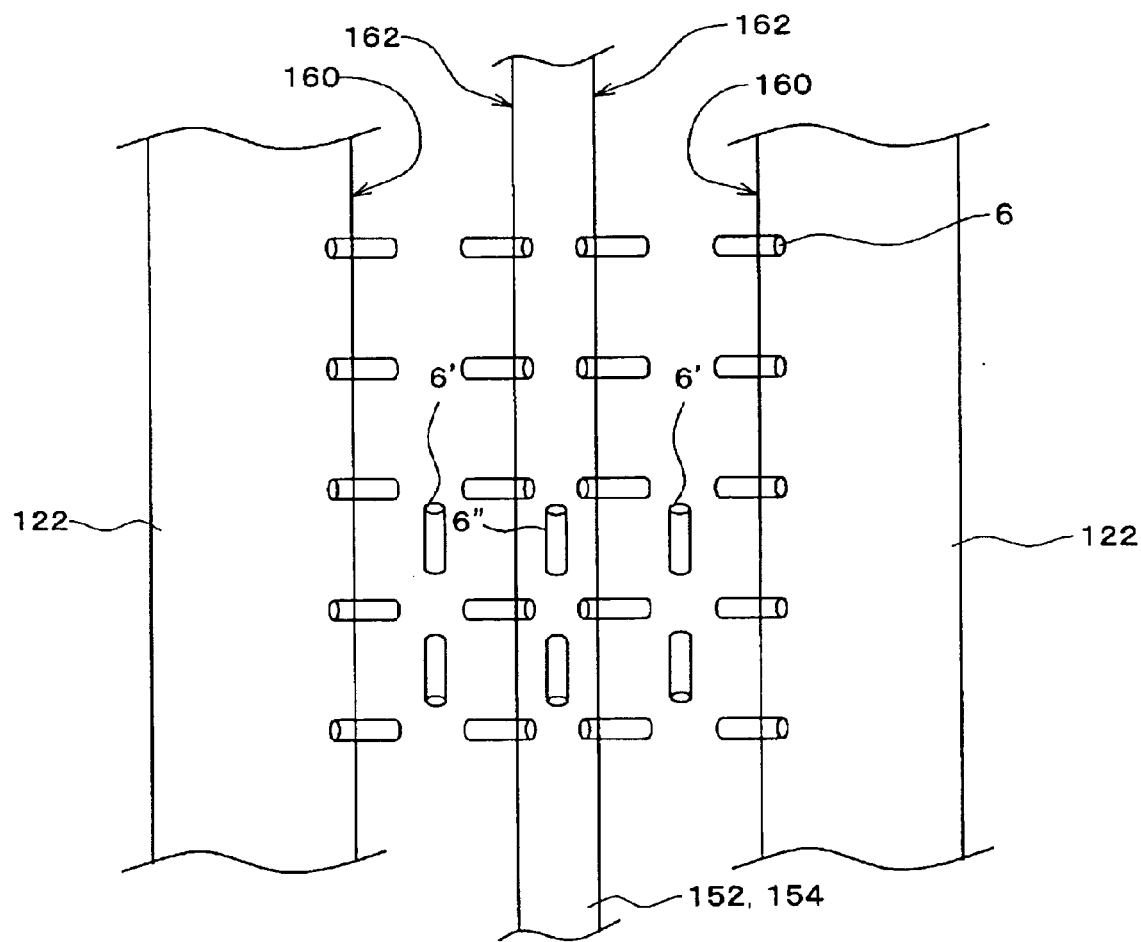
Figure 35:
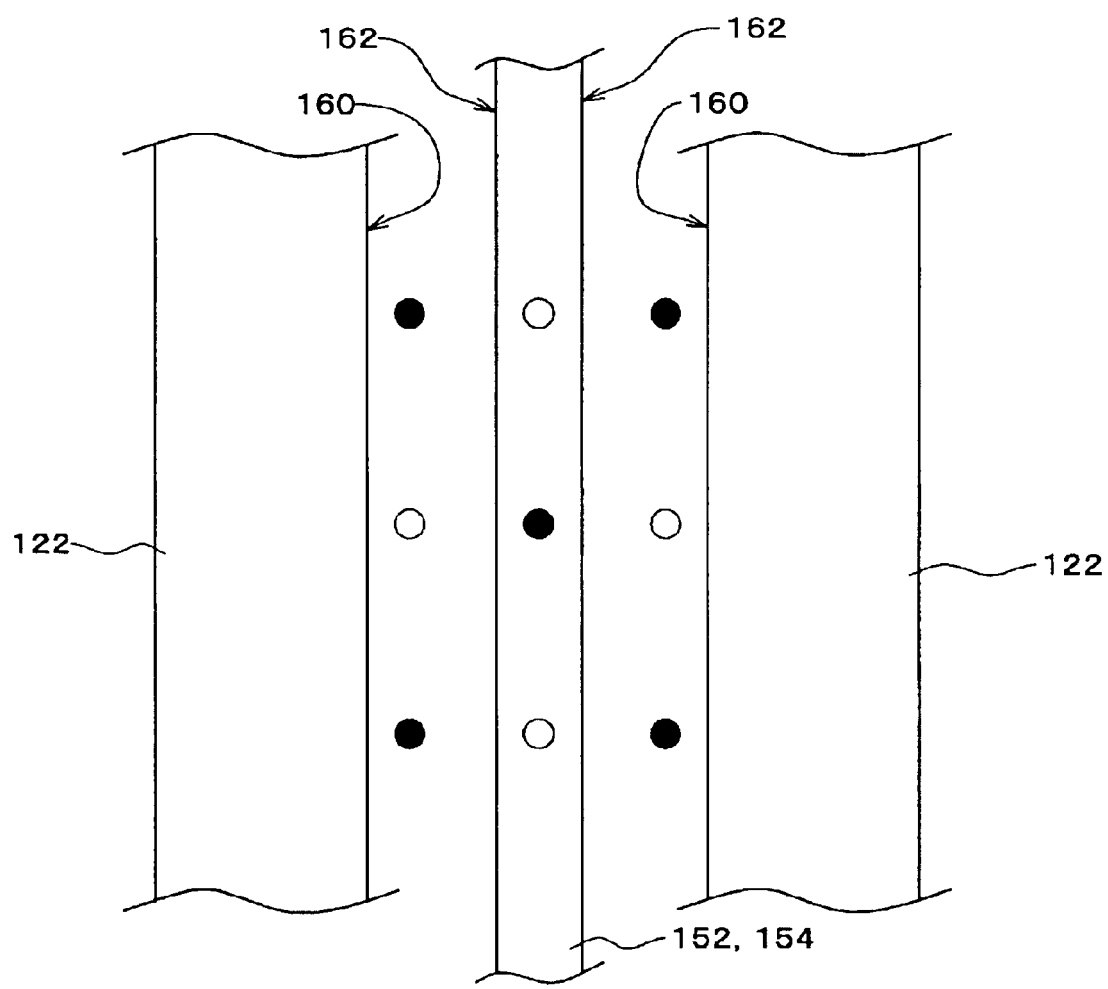
Figure 36:
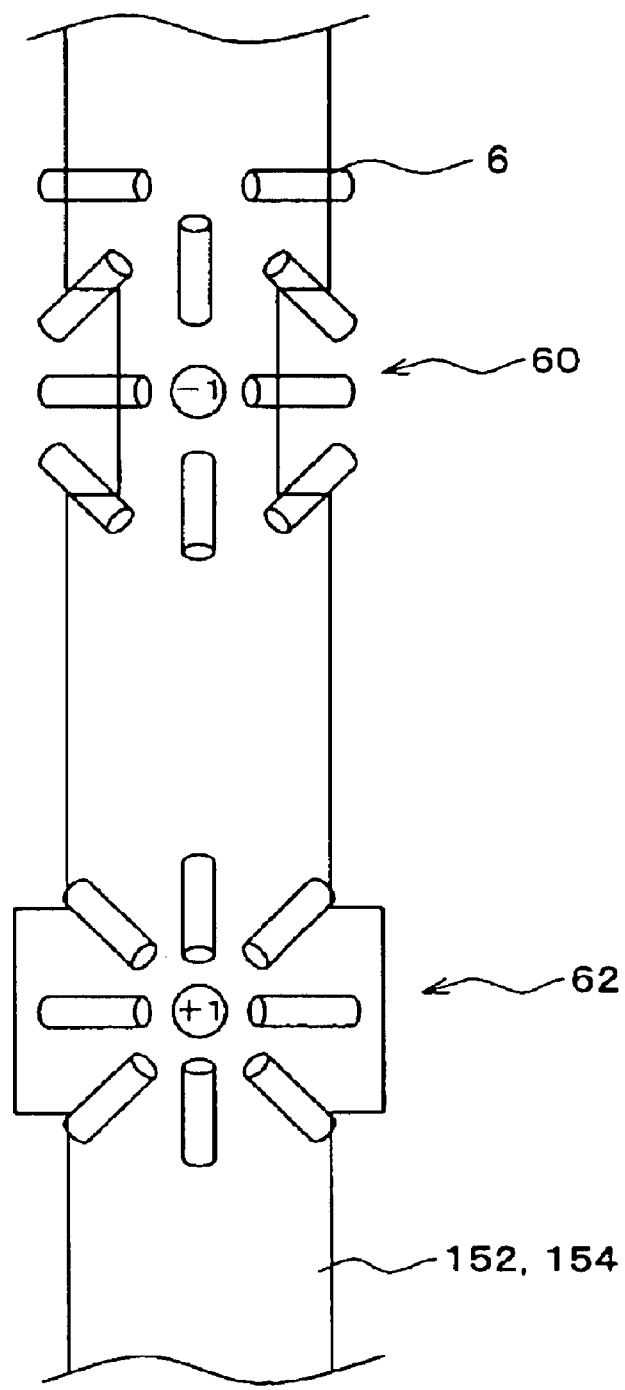
Figure 38:
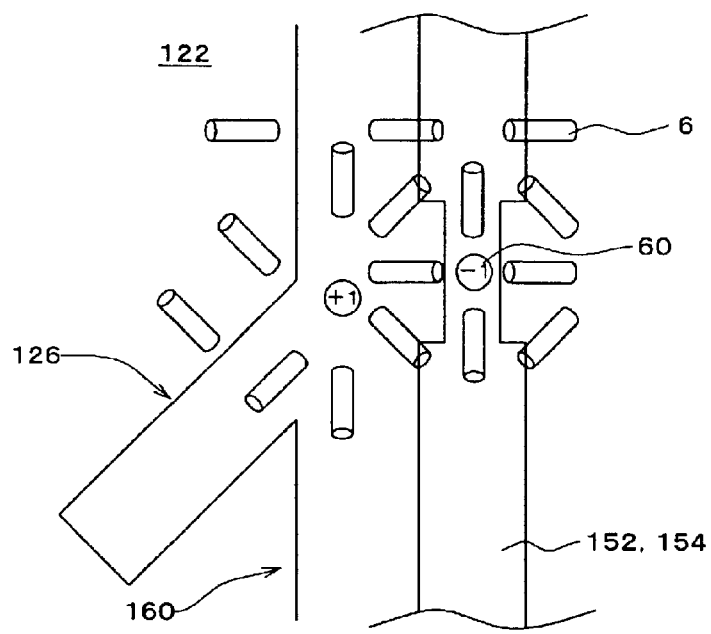
Figure 39:
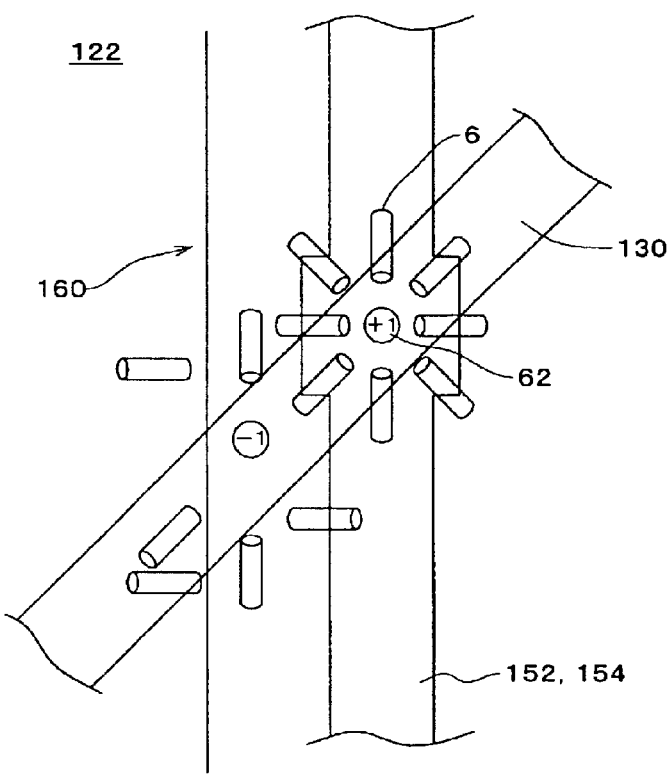
Figure 40:
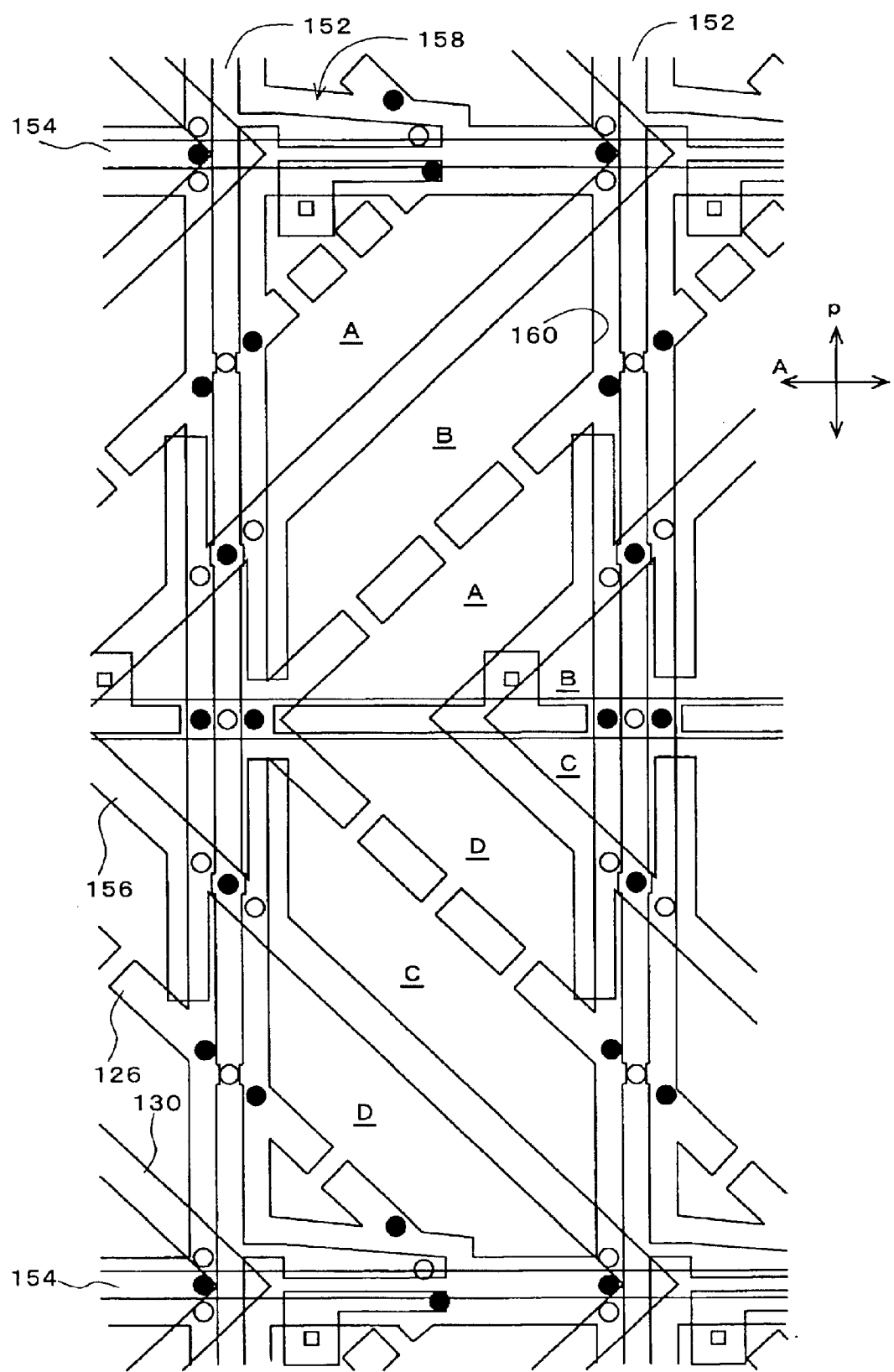
Figure 41:
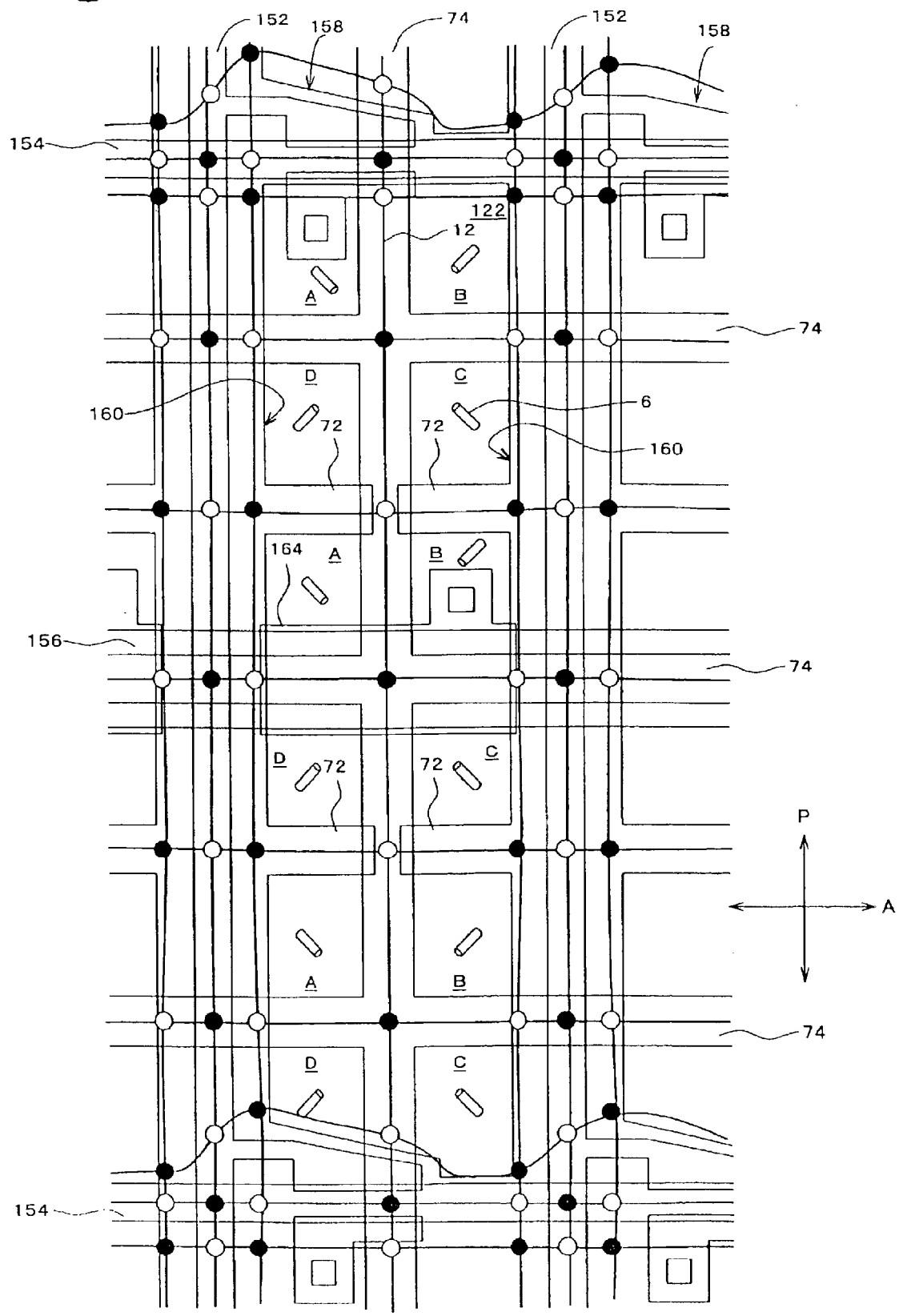
Figure 42A:
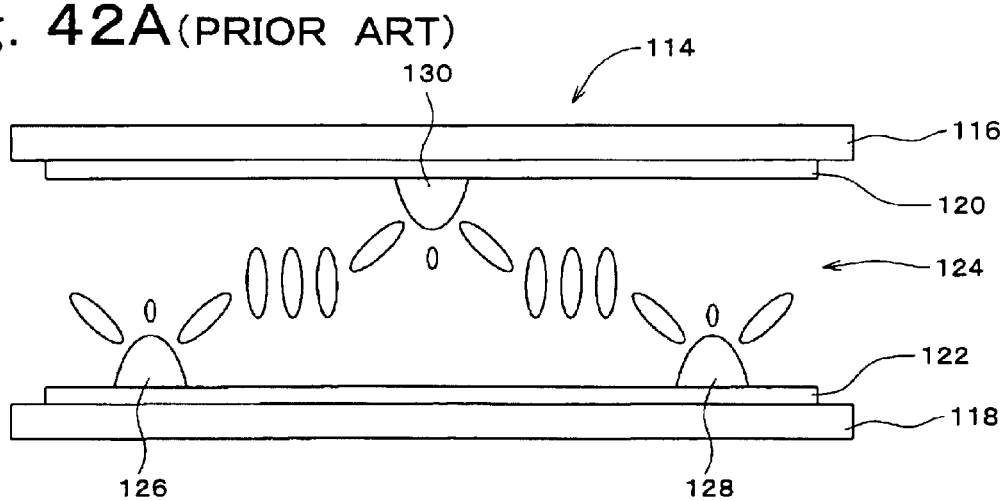
Figure 42B:
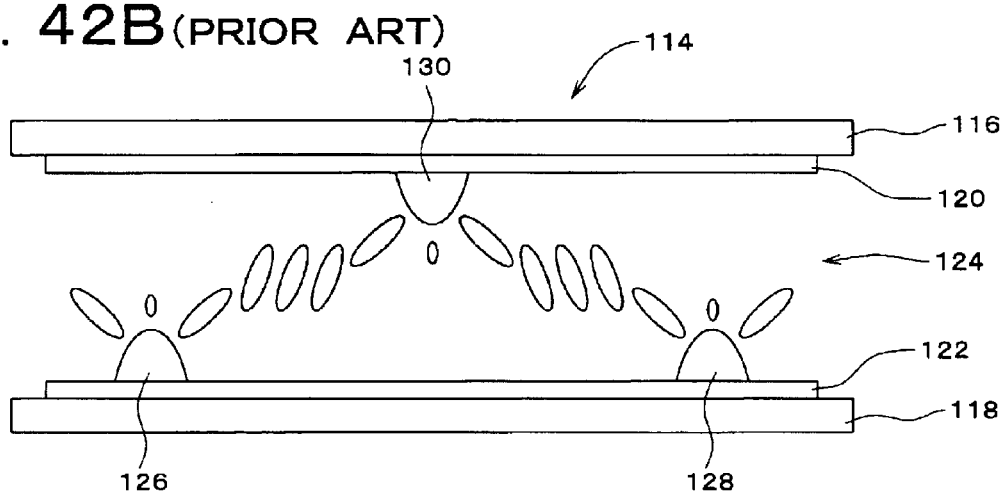
Figure 42C:
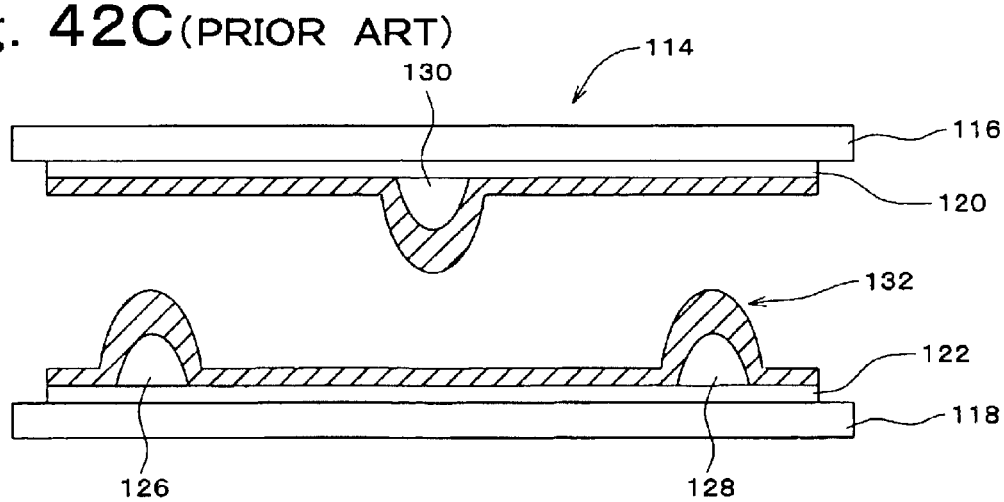
Figure 43A:
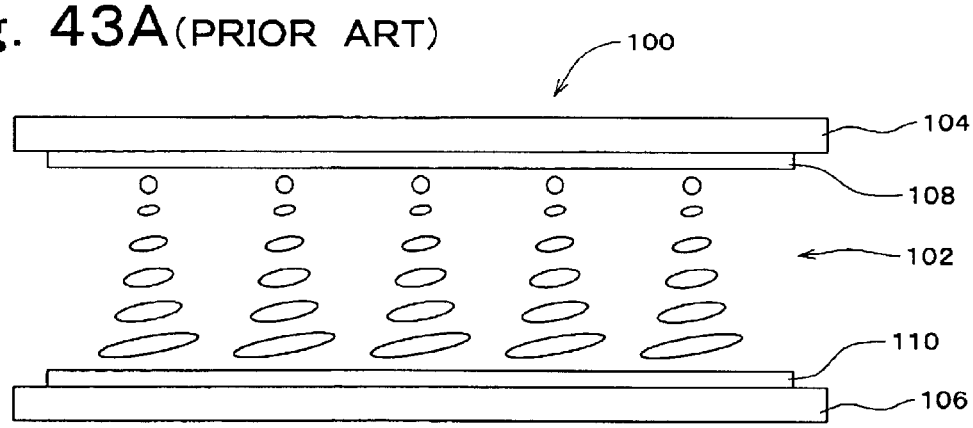
Figure 43B:
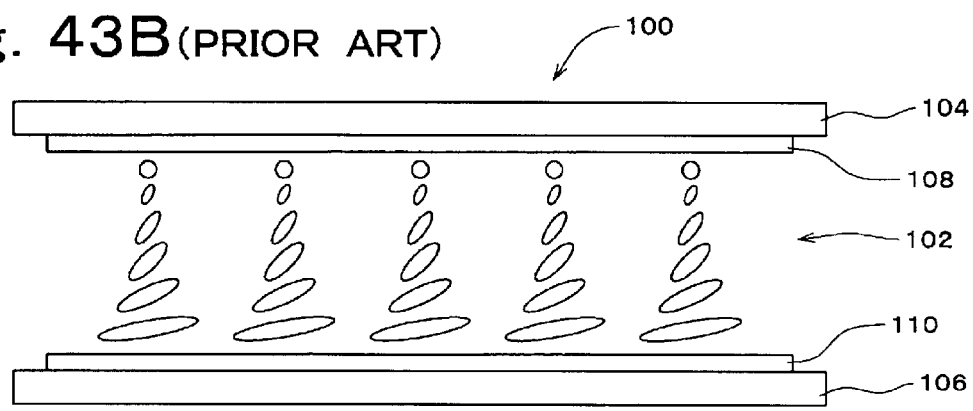
Figure 43C:
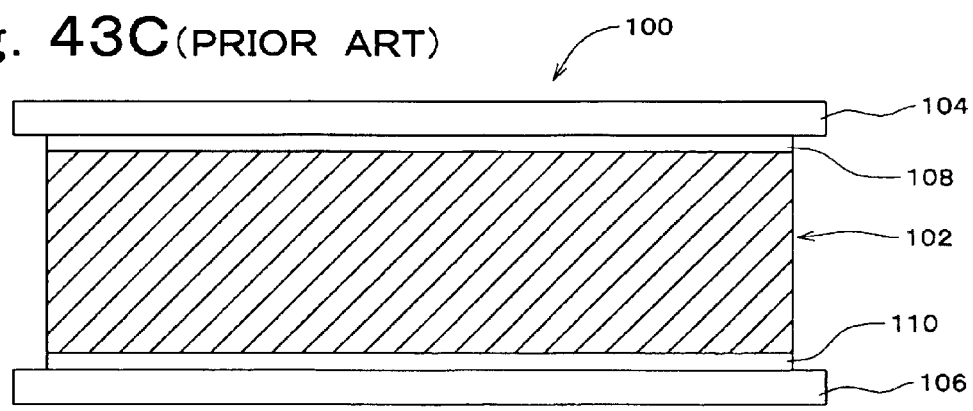
Figure 44:
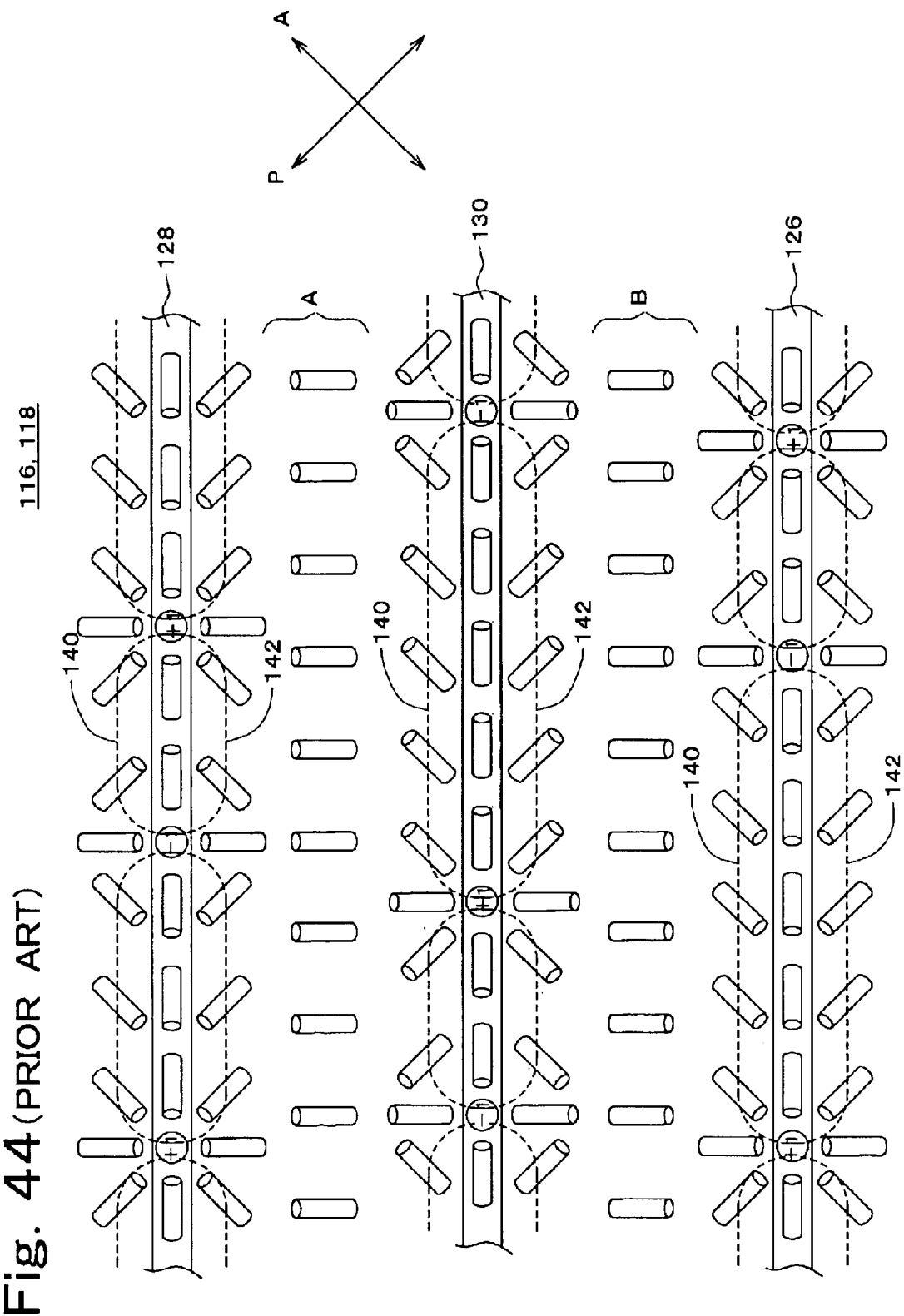

as viewed in the direction of the normal line of the substrate surfaces in the case of four separate alignments according to the first mode for carrying out the invention;

FIG. 6 is a schematic diagram showing still another example of control elements for forming a first singular point (s=+1) as viewed in the direction of the normal line of the substrate surfaces in the case of four separate alignments according to the first mode for carrying out the invention;

FIG. 7 is a schematic diagram showing still another example of control elements for forming a first singular point (s=+1) as viewed in the direction of the normal line of the substrate surfaces in the case of four separate alignments according to the first mode for carrying out the invention;

FIG. 8 is a schematic diagram showing still another example of control elements for forming a first singular point (s=+1) as viewed in the direction of the normal line of the substrate surfaces in the case of four separate alignments according to the first mode for carrying out the invention;

FIG. 9 is a schematic diagram showing still another example of control elements for forming a first singular point (s=+1) as viewed in the direction of the normal line of the substrate surfaces in the case of four separate alignments according to the first mode for carrying out the invention;

FIG. 10 is a schematic diagram showing still another example of control elements for forming a first singular point (s=+1) as viewed in the direction of the normal line of the substrate surfaces in the case of four separate alignments according to the first mode for carrying out the invention;

FIG. 11 is a schematic diagram showing still another example of control elements for forming a first singular point (s=+1) as viewed in the direction of the normal line of the substrate surfaces in the case of four separate alignments according to the first mode for carrying out the invention;

FIG. 12 is a schematic diagram showing still another example of control elements for forming a first singular point (s=+1) as viewed in the direction of the normal line of the substrate surfaces in the case of four separate alignments according to the first mode for carrying out the invention;

FIG. 13 is a schematic diagram showing an example of control elements for forming a second singular point (s=−1) as viewed in the direction of the normal line of the substrate surfaces in the case of four separate alignments according to the first mode for carrying out the invention;

FIG. 14 is a schematic diagram showing another example of control elements for forming a second singular point (s=−1) as viewed in the direction of the normal line of the substrate surfaces in the case of four separate alignments according to the first mode for carrying out the invention;

FIG. 15 is a schematic diagram showing still another example of control elements for forming a second singular point (s=−1) as viewed in the direction of the normal line of the substrate surfaces in the case of four separate alignments according to the first mode for carrying out the invention;

FIG. 16 is a schematic diagram showing still another example of control elements for forming a second singular point (s=−1) as viewed in the direction of the normal line of the substrate surfaces in the case of four separate alignments according to the first mode for carrying out the invention;

FIG. 17 is a schematic diagram showing still another example of control elements for forming a second singular point (s=−1) as viewed in the direction of the normal line of the substrate surfaces in the case of four separate alignments according to the first mode for carrying out the invention;

FIG. 18 is a schematic diagram showing still another example of control elements for forming a second singular point (s=−1) as viewed in the direction of the normal line of the substrate surfaces in the case of four separate alignments according to the first mode for carrying out the invention;

FIG. 19 is a schematic diagram showing still another example of control elements for forming a second singular point (s=−1) as viewed in the direction of the normal line of the substrate surfaces in the case of four separate alignments according to the first mode for carrying out the invention;

FIGS. 20A and 20B are illustrations of an example of a state of alignment of liquid crystal molecules in the vicinity of a first singular point (s=+1);

FIG. 21 is a schematic illustration of a part of a liquid crystal display as Embodiment 1 in the first mode for carrying out the invention as viewed in the direction of the normal line of a surface of a substrate thereof;

FIG. 22 is a diagram showing the relationship between a protruding height of grid-shaped structures 50 and 52 used in Embodiment 1 in the first mode for carrying out the invention and transmittance against white;

FIG. 23 is a diagram showing T-V characteristics of the liquid crystal display of Embodiment 1 in the first mode for carrying out the invention;

FIG. 24 is a diagram showing response characteristics of the liquid crystal display of Embodiment 1 in the first mode for carrying out the invention;

FIG. 25 is a schematic view of a section of a part of a liquid crystal display as Embodiment 2 in the first mode for carrying out the invention;

FIG. 26 is a diagram showing response characteristics of the liquid crystal display of the Embodiment 2 in the first mode for carrying out the invention;

FIG. 27 is a schematic illustration of a part of a liquid crystal display as Embodiment 3 in the first mode for carrying out the invention as viewed in the direction of the normal line of a surface of a substrate thereof;

FIG. 28 is an illustration of an after-image phenomenon that occurs in conventional MVA LCD for explaining a second mode for carrying out the invention;

FIGS. 29A through 29C are illustrations of a singular Point forming portion 150 proposed in Japanese patent application No. H11-229249 for explaining the second mode for carrying out the invention;

FIG. 30 is an illustration showing one pixel region of the conventional MVA type TFT LCD shown in FIGS. 29A through 29C as viewed from the side of an upper substrate 116 thereof and showing the neighborhood of the same;

FIG. 31 is a modification of FIG. 30 in which the substrate structure is omitted to show only first and second singular points, the alignment of liquid crystal molecules 6 and two dark lines 140 and 142;

FIGS. 32A and 32B are illustrations for explaining distortion of electric fields at edges of a pixel electrode 122;

FIGS. 33A and 33B are illustrations for explaining distortion of electric fields at edges of bus lines 152 and 154;

FIG. 34 is an illustration showing a state of alignment of liquid crystal molecules 6 in the vicinity of bus lines 152 and 154 between adjoining pixel electrodes 122;

FIG. 35 is an illustration that explains a principle for achieving stable alignment in a liquid crystal display in the second mode for carrying out the invention;

FIG. 36 is a schematic illustration of a part of a liquid crystal display as Embodiment 1 in the second mode for carrying out the invention as viewed in the direction of the normal line of a surface of a substrate thereof;

FIGS. 37A through 37E are illustrations showing a schematic configuration of a liquid crystal display as Embodiment 2 in the second mode for carrying out the invention;

FIG. 38 is a schematic illustration of a part of a liquid crystal display as Embodiment 3 in the second mode for carrying out the invention as viewed in the direction of the normal line of a surface of a substrate thereof;

FIG. 39 is a schematic illustration of a part of a liquid crystal display as Embodiment 4 in the second mode for carrying out the invention as viewed in the direction of the normal line of a surface of a substrate thereof;

FIG. 40 is a schematic illustration of a part of a liquid crystal display as Embodiment 5 in the second mode for carrying out the invention as viewed in the direction of the normal line of a surface of a substrate thereof;

FIG. 41 is a schematic illustration of a part of a liquid crystal display as Embodiment 6 in the second mode for carrying out the invention as viewed in the direction of the normal line of a surface of a substrate thereof;

FIGS. 42A through 42C are illustrations for explaining a reason of the fact that the response of a conventional MVA LCD to halftones are slower than that of a conventional TN-type LCD;

FIGS. 43A through 43C are illustrations for explaining a reason of the fact that the response of a conventional MVA LCD to halftones are slower than that of a conventional TN-type LCD; and FIG. 44 is an illustration showing a state of alignment of liquid crystal molecules of the MVA LCD shown in FIGS. 42A through 42C when a voltage is applied as viewed from the side of a lower substrate 118 thereof.

DETAILED DESCRIPTION OF THE PREFERRED EMBODIMENTS

[First Mode for Carrying Out the Invention]

Figure 1:
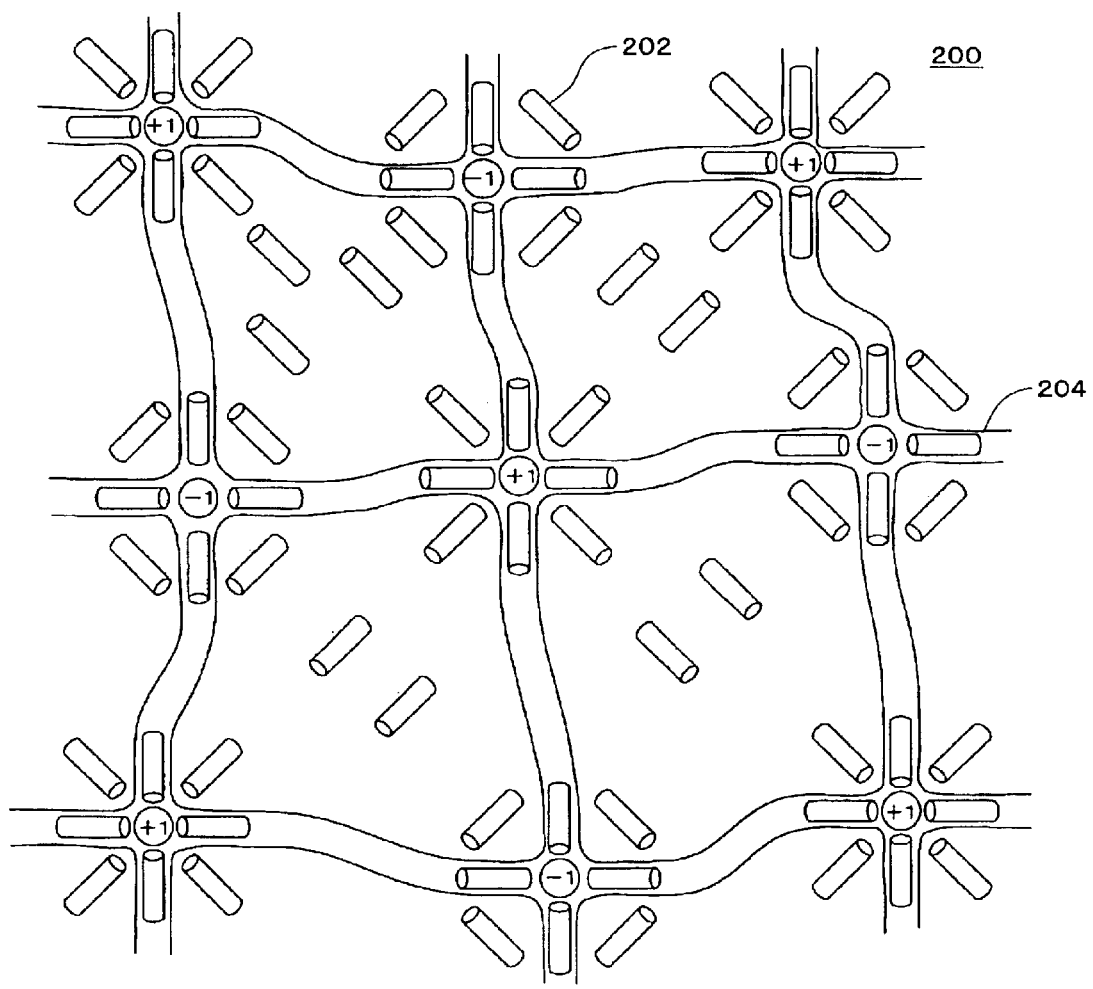
FIG. 1 is an illustration of a liquid crystal panel in which electrodes and vertical alignment films are formed on surfaces facing each other and in which liquid crystals having negative dielectric anisotropy are sealed between two vertical alignment films for explaining an operation of a liquid crystal display according to a first mode for carrying out the invention.

A liquid crystal display in a first mode for carrying out the invention will now be described with reference to FIGS. 1 through 27. FIG. 1 shows a liquid crystal panel in which electrodes and vertical alignment films 200 are formed on surfaces facing each other and in which liquid crystals having negative dielectric anisotropy are sealed between the two vertical alignment films, as viewed from the side of one of panel surfaces thereof. No rubbing process is provided on the vertical alignment films 200, and no linear protrusion or the like is formed on the same. The inventors closely observed the behavior of liquid crystal molecules 202 while applying a voltage to the opposite electrodes of the liquid crystal panel shown in FIG. 1 to apply a longitudinal electric field and consequently found that certain conditions must be met to stabilize the alignment of the liquid crystal molecules 202.

As shown in FIG. 1, when a longitudinal electric field is applied to the liquid crystals having negative dielectric anisotropy using vertical alignment films 200 on which no rubbing process is provided, a great number of singular points (indicated by +1 or –1 in the figure) are generated in a liquid crystal alignment vector field when the liquid crystals 202 are inclined. While the singular points are generated at random positions, adjoining singular points connected by a single disclination line 204 have opposite signs (+1 or –1), and a first singular point and a second singular point as described above are formed adjacent to each other. The sum of the signs of first and second singular points in an alignment film is substantially 0. That is, substantially the same number of first and second singular points are formed.

Japanese patent application No. H11-229249 filed by the present applicants has proposed an MVA LCD in which the alignment of liquid crystals is regulated by an oblique electric field provided by inclined surfaces of linear protrusions made of an isolator or slits and in which singular points are constricted on the linear protrusions or slits to provide preferable display. According to this proposal, quality of display can be improved by preventing formation of singular points on display regions between the linear protrusions. However, since singular points are aligned on the linear protrusions, as shown in FIG. 44, the singular points are connected to each other by two dark lines (disclination lines) on both sides of the linear protrusions. Further, while control can be performed to prevent singular points entering the display regions in the gaps between the linear protrusions according to the above proposal, the positions of singular points formed on the linear protrusions are not controlled. Furthermore, the above proposal is not different from the conventional alignment separation control methods at all in that liquid crystal molecules are aligned utilizing distortions of electric fields caused by structures in the form of protrusions or slits.

On the contrary, the liquid crystal display in the present mode for carrying out the invention employs a novel method for alignment separation control which has been conceived based on results of the above-described observation of the behavior of liquid crystal molecules and the formation of singular points when a voltage is applied. The method for controlling alignment separation in the present mode for carrying out the invention is characterized in that control over the direction of alignment of liquid crystal molecules is achieved by controlling the positions where singular points are formed and in that distortion of electric fields is used only for controlling the positions where singular points are formed.

Figure 2:
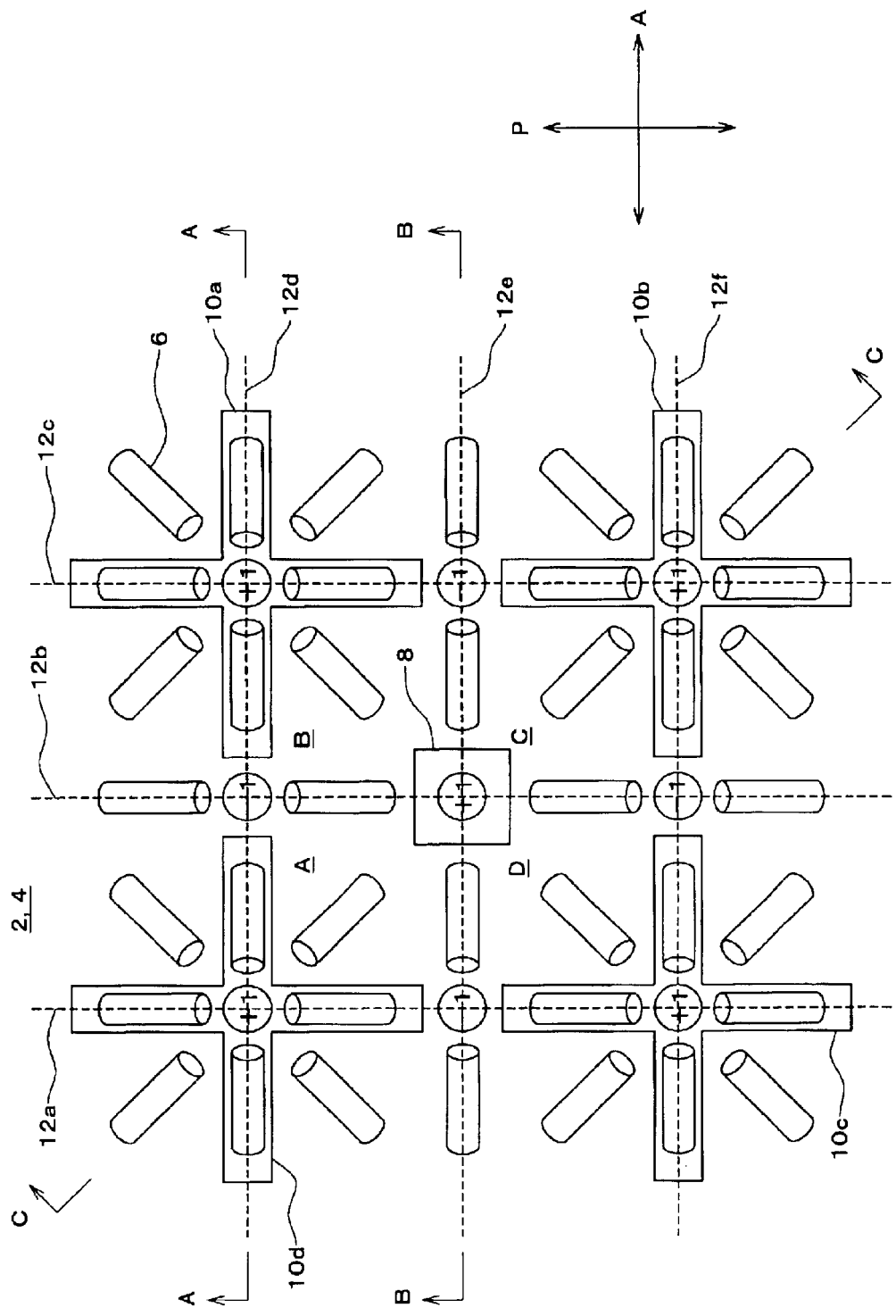
FIG. 2 is an illustration of the liquid crystal display according to the first mode for carrying out the invention as viewed in the direction of the normal line of a surface of a substrate thereof for explaining a method for controlling separation of alignment.
Figure 3A:
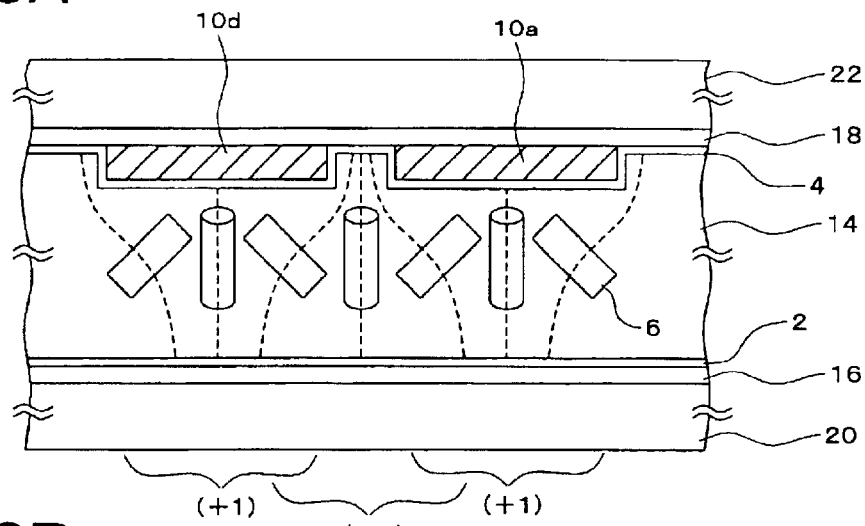
FIGS. 3A through 3C are illustrations of states of the liquid crystal display according to the first mode for carrying out the invention in a sectional direction for explaining a method for controlling separation of alignment.
Figure 3B:
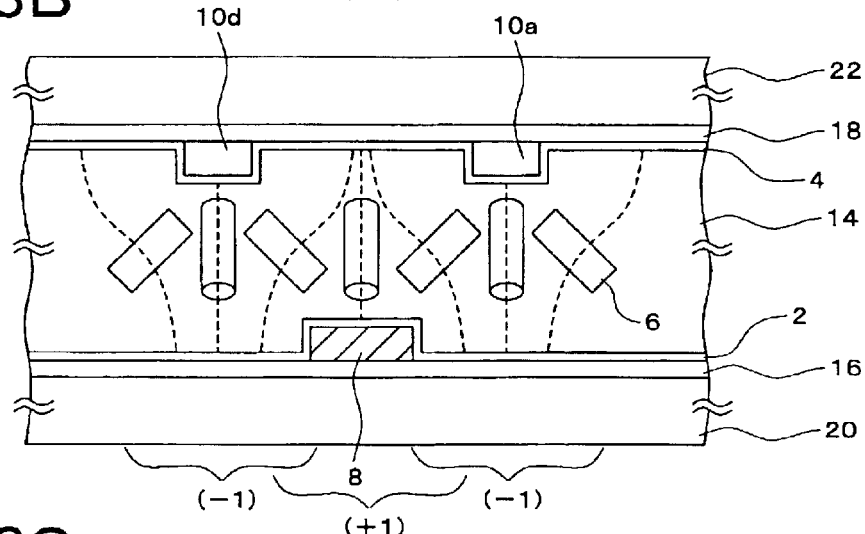
Figure 3C:
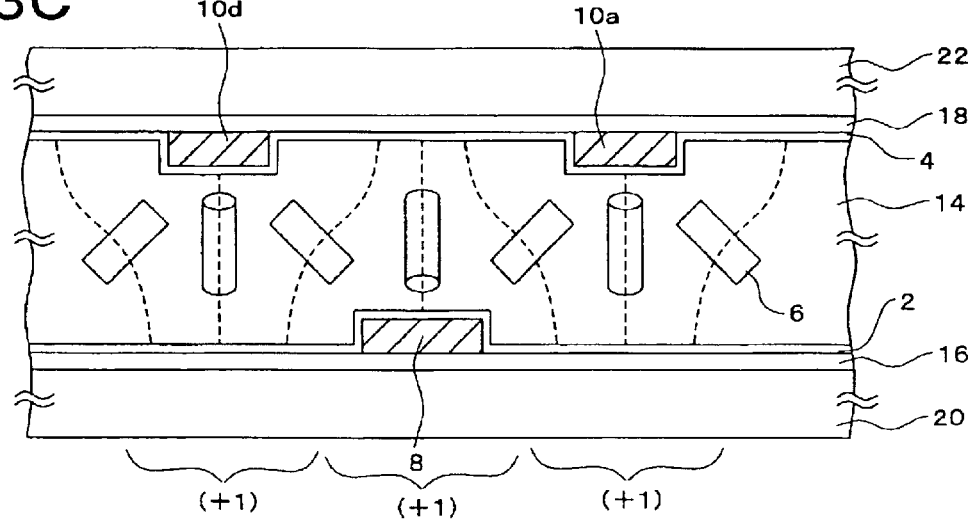

The method for controlling alignment separation in the present mode for carrying out the invention will be described with reference to FIG. 2 and FIGS. 3A through 3C. FIG. 2 shows a state of the liquid crystal display as viewed in the direction of the normal line of the surface of one of substrates thereof. FIGS. 3A through 3C show states of a major part as viewed on sections taken along lines A—A, B—B and C—C in FIG. 2, respectively.

As shown in FIGS. 2 through 3C, the liquid crystal display has a lower substrate 20 and an upper substrate 22 facing each other with a predetermined gap therebetween, electrodes 16 and 18 respectively formed on surfaces of the lower substrate 20 and upper substrate 22 which face each other, vertical alignment films 2 and 4 formed on the electrodes 16 and 18 facing each other and liquid crystals 14 having negative dielectric anisotropy sealed between the lower substrate 20 and upper substrate 22. It further has structures 8, 10a, 10b, 10c and 10d in the form of protrusions formed in a repetitive pattern on the surfaces of the substrates as a singular point controlling portion for controlling singular points in an alignment vector field of the liquid crystals 14 such that they are formed in predetermined positions when a voltage is applied between the electrodes 16 and 18.

The protruding structure 8 is formed on the electrode 16 on the lower substrate 20, and the top of the protruding structure is covered by the vertical alignment film 2. While the protruding structure 8 is preferably in a configuration like a square pole with a small height, it may have a different configuration similar to the same. The protruding structures 10a, 10b, 10c and 10d are formed on the electrode 18 on the upper substrate 22 such that they surround the protruding structure 8 at a predetermined interval (pitch). The top of the protruding structures 10a through 10d is covered by the vertical alignment film 4. Each of the protruding structures 10a through 10d having a predetermined height has a cross-shaped configuration when vied from the side of the substrate surface as shown in FIG. 2. The protruding structures 10a through 10d are provided adjacent to each other such that the ends of the crosses face each other at a predetermined interval. Liquid crystal display regions are formed between the protruding structures 10a through 10d and the protruding structures 8 surrounded by the same.

When a voltage is applied between the electrodes 16 and 18 of the liquid crystal display having such a configuration, the electric fields applied to the liquid crystals 14 are distorted by the protruding structures 8 and 10a through 10d as indicated by the broken lines in FIGS. 3A through 3C. The alignment of liquid crystal molecules 6 on the protruding structures 8 and 10a through 10d and in the vicinity thereof is regulated by the distortion of the electric fields. First singular points (indicated by +1) are formed in the middle of the protruding structures 8 and 10a through 10d, and second singular points (indicated by -1) are formed at the ends of the protruding structures 10a through 10d in the form of crosses.

Therefore, as apparent from FIG. 2, the first singular points and second singular points are formed adjacent to each other in the lateral and vertical directions of the figure and are formed in substantially the same quantity. It is therefore possible to achieve quite stable alignment which satisfies the conditions for stable alignment of liquid crystal molecules described with reference to FIG. 1. Further, as shown in FIG. 2, the protruding structures 8 and 10a through 10d as alignment control portions control the alignment of liquid crystals such that the directions of the longitudinal axes of liquid crystal molecules in liquid crystal domains adjacent to each other located on both sides of an imaginary straight line connecting a first singular point and a second singular point are at an angle of 45 deg. to the imaginary straight line when the voltage is applied. Therefore, each of the liquid crystal display regions between the protruding structures 10a through 10d and the protruding structure 8 surrounded thereby is separated into alignment regions A, B, C and D having four different directions of alignment, as shown in FIG. 2.

The positions where singular points are formed are controlled using the singular point control portions (the protruding structures 8 and 10a through 10d in the present example) such that the directions of alignment of the longitudinal axes of the liquid crystal molecules 6 in the alignment regions A, B, C and D are substantially at an angle of 45 deg. to the polarizing axes of two polarizers (not shown) having polarizing axes orthogonal to each other as viewed in the normal direction of the surfaces of the substrates 20 and 22 when the voltage is applied. This makes it possible to achieve a quite large viewing angle and contrast ratio.

Further, while two dark lines have been formed on both sides of a linear protrusion according to the prior art, only one dark line (indicated by reference numerals 12a through 12f in FIG. 2) is formed for each of an imaginary straight line as described above when the singular point control portions in the present mode for carrying out the invention are used. Only one of the dark lines 12a through 12f is formed in each boundary for alignment separation, and the reduction of transmittance at the boundaries for separation can be reduced to about one half of that in conventional MVA LCD because the singular point control portions suppress expansion of the width of each dark line by distorting an electric field in a direction orthogonal to the imaginary straight line when the voltage is applied. Any reduction of transmittance can therefore be avoided even when structures acting as singular point control portions are provided in pixel regions at a density higher than that of conventional linear protrusions or the like for regulating alignment. This makes it possible to form singular points at reduced intervals by providing a greater number of structures, thereby allowing response at a higher speed to slight tone changes of halftones.

As thus described, the present mode for carrying out the invention makes it possible to achieve high speed response of liquid crystals while suppressing any reduction of transmittance by providing the singular point control portions in a higher density. When the singular point control portions are provided in a density similar to that of conventional linear protrusions for regulating alignment, transmittance can be significantly improved compared to the prior art.

Liquid crystal molecules 6 on the protruding structures formed on the substrates are preferably sufficiently inclined when a voltage is applied to allow singular points to be easily formed. For this reason, the height of the protruding structures may be smaller than the height of conventional linear protrusions or the like for regulating alignment.

Figure 4:
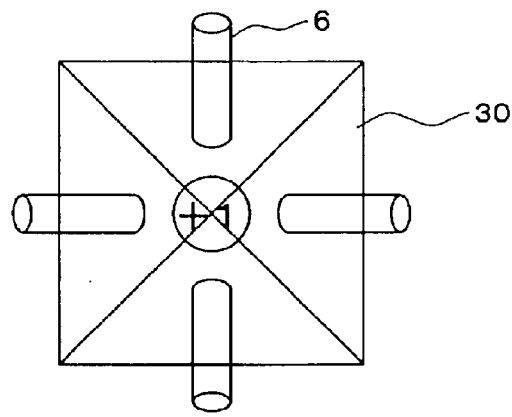
FIG. 4 is a schematic diagram showing an example of control elements for forming a first singular point (s=+1) in the direction of the substrate surfaces in the case of four separate alignments according to the first mode for carrying out the invention.

The above-described configurations the protruding structures 8 and 10a through 10d as singular point control portions are merely examples, and elements for controlling the positions of singular points acting as singular point control portions may be in various configurations. FIGS. 4 through 12 are schematic views of examples of control elements for forming first singular points (s=+1) in the case of four separate alignments as viewed in the direction of the normal line of the substrates. FIG. 4 shows a protruding structure 30 made of an insulator in the form of a quadrangular pyramid. By providing the quadrangular pyramid such that its bottom is located on the surface of at least either the lower substrate 20 or upper substrate 22, it is possible to incline liquid crystal molecules 6 in the vicinity of the inclined surfaces of the quadrangular pyramid in a direction perpendicular to the inclined surfaces, thereby forming a first singular point in the middle of the protruding structure 30 as viewed in the direction of the normal line of the substrate surface.

Figure 5:
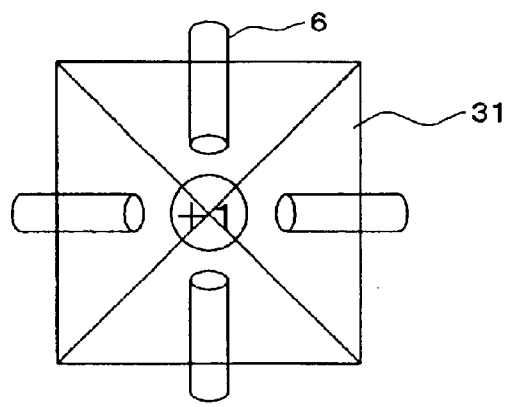
FIG. 5 is a schematic diagram showing another example of control elements for forming a first singular point (s=+1)

FIG. 5 shows a protruding structure 31 made of a conductor in the form of a quadrangular pyramid. By providing it such that the bottom of the quadrangular pyramid is located on the surface of at least either the lower substrate 22 or upper substrate 22, it is possible to incline liquid crystal molecules 6 in the vicinity of the inclined surfaces of the quadrangular pyramid in a direction in parallel with the inclined surfaces, thereby forming a first singular point in the middle of the protruding structure 31 as viewed in the direction of the normal line of the substrate surface.

Instead of protruding structures as element for controlling the position of a singular point, FIG. 6 shows a square region 32 in either of the electrode surfaces of the electrodes 16 and 18 provided on the lower substrate 20 and upper substrate 22 where no transparent electrode material (e.g., ITO (indium tin oxide)) is formed (hereinafter, similar features are referred to as "non-electrode region"). A first singular point is formed in the middle of the non-electrode region 32 as viewed in the direction of the normal line of the substrate surface, and this region has the same function as that of the protruding structure 30 shown in FIG. 4.

FIG. 7 shows four non-electrode regions 33a through 33d formed in the four corners of a square in either of the electrode surfaces of the electrodes 16 and 18 provided on the lower substrate 20 and upper substrate 22, as elements for controlling the position of a singular point. Each of the non-electrode regions 33a through 33d are in the form of a square. A first singular point is formed in the middle of a square whose corners are the non-electrode regions 33a through 33d as viewed in the direction of the normal line of the substrate surface.

A protruding structure 34 shown in FIG. 8 has a cross-like configuration similarly to the protruding structures 10a through 10d shown in FIG. 2 and is provided on the surface of at least either the lower substrate 20 or upper substrate 22. While the protruding structures 10a through 10d are formed from an insulator, the protruding structure 34 may be formed from a conductor instead of being limited to the insulator. The electrode on the substrate may be patterned into the protruding structure 34. A first singular point is formed in the middle of the cross of the protruding structure 34 and, when the protruding structure 34 is a conductor or electrode, liquid crystal molecules 6 are aligned in the direction opposite to the direction in the case of an insulator (the directions are substantially symmetric about the normal line of the substrate surface that pass through the center of the liquid crystal molecules).

Instead of protruding structures as elements for controlling the positions of singular points, FIG. 9 shows a non-electrode region 35 in the form of a cross in the surface of at least either of the electrodes 16 and 18 provided on the lower substrate 20 and upper substrate 22. A first singular point is formed in the middle of the cross of the non-electrode region 35 as viewed in the direction of the normal line of the substrate surface.

FIG. 10 shows a protruding structure 36 formed by four protruding structures 30 made of an insulator in the form of a quadrangular pyramid as shown in FIG. 4 which are tightly concentrated. By disposing it such that the bottom of each quadrangular pyramid is located on the surface of at least either the lower substrate 20 or upper substrate 22, liquid crystal molecules 6 on the ridges of the protruding structure 30 can be inclined in a direction perpendicular to the ridges to form a first singular point in the middle of the protruding structure 36 as viewed in the direction of the normal line of the substrate surface.

FIG. 11 shows a protruding structure 37 formed by four protruding structures 31 made of a conductor in the form of a quadrangular pyramid as shown in FIG. 5 which are tightly concentrated. By disposing it such that the bottom of each quadrangular pyramid is located on the surface of at least either the lower substrate 20 or upper substrate 22, liquid crystal molecules 6 on the ridges of the protruding structure 31 can be inclined in a direction in parallel with the ridges to form a first singular point in the middle of the protruding structure 37 as viewed in the direction of the normal line of the substrate surface.

FIG. 12 shows a state in which a linear protrusion 38 made of an insulator is formed on either the lower substrate 20 or upper substrate 22, e.g., on the lower substrate 20 and in which a linear protrusion 39 made of a conductor is formed on the upper substrate 22 perpendicularly to the linear protrusion 38 as viewed in the direction of the normal line of the substrate surface. As a result, a first singular point is formed at the intersection of the linear protrusions 38 and 39 as viewed in the direction of the normal line of the substrate surface, and liquid crystal molecules 6 are aligned such that they converge from the side of the upper substrate 22 toward the lower substrate 20.

FIGS. 13 through 19 are schematic illustrations of examples of control elements for forming a second singular point (s=−1) in the case of four separate alignments, as viewed in the direction of the normal line of the surface of a substrate. FIG. 13 shows a protruding structure 40 as an element for controlling the position of a second singular point. The protruding structure 40 is in the form of a linear protrusion which has a discontinuation in the middle thereof and is provided on at least either the lower substrate 20 or upper substrate 22. While the protruding structure 40 is formed from an insulator, the protruding structure 40 may be formed from a conductor instead of being limited to insulators. Further, it is possible to use the protruding structure 40 itself as an electrode. A second singular point is formed in the middle of the protruding structure 40 as viewed in the direction of the normal line of the substrate surface and, when the protruding structure 40 is a conductor or electrode, liquid crystal molecules 6 are aligned in the direction opposite to that in the case of an insulator.

Instead of a protruding structure as an element for controlling the position of a singular point, FIG. 14 shows a non-electrode region 41 which is formed by two slits arranged in a row with ends thereof facing each other in the surface of at least either of the electrodes 16 and 18 provided on the lower substrate 20 and upper substrate 22. A second singular point is formed in the middle of the non-electrode region 41 as viewed in the direction of the normal line of the substrate surface.

As an element for controlling the position of a singular point, FIG. 15 shows two non-electrode regions 42a and 42b formed in positions on a diagonal line of a square in the surface of at least either of the electrodes 16 and 18 provided on the lower substrate 20 and upper substrate 22. Each of the non-electrode regions 42a and 42b has a square configuration. A second singular point is formed in the middle of a straight line which connects the non-electrode regions 42a and 42b as viewed in the direction of the normal line of the substrate surface.

FIG. 16 shows a state in which a linear protrusion 43 made of an insulator is formed on either the lower substrate 20 or upper substrate 22, e.g., on the lower substrate 20 and in which a linear protrusion 44 made of a conductor is formed on the upper substrate 22 perpendicularly to the linear protrusion 43 as viewed in the direction of the normal line of the substrate surface. As a result, a second singular point is formed at the intersection of the linear protrusions 43 and 44 as viewed in the direction of the normal line of the substrate surface. The linear protrusions 43 and 44 may be formed from a conductor instead of an insulator. The electrode on the substrate may alternatively be patterned to be used as the linear protrusions 43 and 44. A second singular point is formed in the middle of the cross formed by the linear protrusions 43 and 44 as viewed in the direction of the normal line of the substrate surface and, when the protrusions 43 and 44 are conductors or electrodes, liquid crystal molecules 6 are aligned in the direction opposite to the direction in the case of an insulator (the directions are substantially symmetric about the normal line of the substrate surface that pass through the center of the liquid crystal molecules).

FIG. 17 shows a state in which a non-electrode region 45 in the form of a slit is formed on the electrode 16 provided on either the lower substrate 20 or upper substrate 22, e.g., on the lower substrate 20 and in which a non-electrode region 46 in the form of a slit is formed on the electrode 18 on the upper substrate 22 perpendicularly to the non-electrode region 45 as viewed in the direction of the normal line of the substrate surface. As a result, a second singular point is formed at the intersection of the non-electrode regions 45 and 46 as viewed in the direction of the normal line of the substrate surface.

FIG. 18 shows a state in which two protruding structures 30 made of an insulator in the form of a quadrangular pyramid as shown in FIG. 4 are arranged side by side on, for example, the lower substrate 20 in the direction of a diagonal line of the bottom of the quadrangular pyramid to form protruding structures 30L and in which protruding structures 30U that are a similar arrangement are formed on the upper sub substrate 22. The protruding structures 30L and 30U form square outline which is densely populated, as viewed in the direction of the normal line of the substrate surface. As a result, liquid crystal molecules 6 on the ridges of the protruding structures 30L are inclined in a direction perpendicular to the ridges, and liquid crystal molecules 6 on the ridges of the protruding structure 30U are inclined in a direction in parallel with the ridges. This makes it possible to form a second singular point in the middle of the square formed by the protruding structures 30L and 30U as viewed in the direction of the normal line of the substrate surface. A second singular point can be formed in the middle of a square that is formed by protruding structures 31 made of a conductor instead of the protruding structures 30 made of an insulator.

FIG. 19 shows a state in which a non-electrode region 47 in the form of a slit is formed on the electrode 16 or 18 on either the lower substrate 20 or upper substrate 22, e.g., on the electrode 16 on the lower substrate 20 and in which a linear protrusion 48 made of an insulator is formed on the upper substrate 22 perpendicularly to the non-electrode region 47 as viewed in the direction of the normal line of the substrate surface. As a result, a second singular point is formed at the intersection between the non-electrode region 47 and linear protrusion 48 as viewed in the direction of the normal line of the substrate surface.

The elements for controlling the positions of singular points described above with reference to FIGS. 4 through 19 are merely examples, and those elements may be combined in various ways to control singular points. The alignment of liquid crystal molecules can be controlled with stability by forming singular points in predetermined positions using those elements.

There are a wide variety of singular points. FIG. 20A shows examples of alignment of liquid crystal molecules in the vicinity of a first singular point (s=+1). (a) in FIG. 20A means that s=+1 and φ (an azimuth angle defined by a predetermined axis and an alignment vector)=0; (b) in FIG. 20A means that s=+1 and φ=π/4; and (c) in FIG. 20A represents the state of alignment of liquid crystal molecules when s=+1 and φ=π/2. The shape of dark lines changes with the value of φ.

FIG. 20B shows examples of alignment of liquid crystal molecules in the vicinity of a second singular point (s=−1). (a) in FIG. 20B means that s=−1 and φ=0; (b) in FIG. 20B means that s=−1 and φ=π/4; and (c) in FIG. 20B represents the state of alignment of liquid crystal molecules when s=−1 and φ=π/2.

While the above description has referred to singular points that are represented by s=+1 and φ=0 or s=−1 and φ=0, the present mode for carrying out the invention can obviously be applied to singular points indicated by (b) and (c) in FIGS. 20A and 20B. According to the present mode for carrying out the invention, in the case of a liquid crystal display whose cell gap is 4 μm, for example, the distance between a first singular point and a second singular point can be controlled within a range from about a few μm to 100 μm in practical use.

The above-described mode for carrying out the invention makes it possible to achieve a speed that is about twice the speed achievable in the prior art for each display tone. When priority is to be put on response characteristics, a response time (Ton+Toff) of 41 ms can be achieved even for a tone for which the response becomes slowest, which makes it possible to provide a liquid crystal display that exhibits excellent in response characteristics in addition to the viewing angle and front contrast characteristics.

A more detailed description will now be made with reference to preferred embodiments of the invention.

[Embodiment 1]

FIG. 21 is a schematic view of a part of a liquid crystal display of the present embodiment as viewed in the direction of the normal line of the surface of a substrate thereof. Referring to a singular point control portion in the present embodiment, protruding structures 34 made of an insulator as shown in FIG. 8 are used as elements for controlling the positions of first singular points, and linear protrusions 43 and 44 made of an insulator as shown in FIG. 16 are used as elements for controlling the positions of second singular points. As combinations of those elements for controlling the positions of singular points, structures 50 in the form of a grid of crosses are formed on a lower substrate 20, and structures 52 in the form of a grid of crosses having the same pitch as that of the grid pitch of the structure 50 are formed on an upper substrate 22 with an offset from the grid pitch of the structures 50 that is equivalent to one half of the grid pitch of the structures 50. Since such singular point control portions are formed on the upper and lower substrates, liquid crystal molecules 6 of liquid crystals sealed between the substrates 20 and 22 are aligned as shown in FIG. 21 when a voltage is applied thereto. This is based on an action similar to that of the singular point control portions in the present mode for carrying out the invention described with reference to FIGS. 2 through 3C.

In the present embodiment, only one dark line is generated in grid-shaped structures 50 and 52 that constitute singular point control portions. This makes it possible not only to achieve a quite stable and preferable state of alignment compared to that in conventional MVA LCDs but also to prevent any reduction in transmittance even when the response characteristics of liquid crystals are improved because the grid pitch is reduced to provide the structures with a density higher than that of conventional linear protrusions for regulating alignment.

In this structure, a first singular point and a second singular point is connected by a pattern of an insulator along a line connecting those points, protrusions of the insulator at connecting portions generate distortion of the distribution of electric fields in the vicinity thereof, which makes it possible to preferably regulate the alignment of a disclination line which appears as a dark line.

FIG. 22 shows the relationship between the height of the grid-shaped structures 50 and 52 used in the present embodiment and the transmittance of white. The height (μm) of the protrusions is plotted along the axis of abscissa, and the transmittance of white (%) is plotted along the axis of ordinate. The curve A in FIG. 22 indicates changes in the transmittance of white of a liquid crystal display in which the length of the gaps between the grid-shaped structures 50 and 52 (or the length of one half of the pitch thereof) provided between the lower substrate 20 and upper substrate 22 is 20 μm, the changes occurring as results of changes in the height of the protrusions 50 and 52 is varied from 0.6 μm to 1.6 μm. The curve B indicates changes in the transmittance of white when the length of the gaps is 10 μm. The curve C indicates changes in the transmittance of white of a display as a comparative example that is equivalent to the conventional MVA LCD shown in FIG. 44 in which the length of gaps between linear protrusions is 25 μm, the changes occurring as results of changes in the height of the linear protrusions from 1.1 μm to 2.3 μm.

As indicated by the curve C, the conventional MVA LCD has a maximum transmittance when the protrusion height is 1.9 μm. In the conventional MVA LCD, the angle of inclination of liquid crystals in the vicinity of the protrusions must be kept small in order to align liquid crystals in directions different from each other by 180 deg. which are symmetric about the protrusions and, therefore, the height of the protrusions can not be so small.

On the contrary, in the case of the liquid crystal display in the present embodiment, the transmittance of white is the maximum when the height of the protrusions is about 1.0 μm regardless of the area occupied by the opening as indicated by the curves A and B, and the transmittance of white conversely becomes low as the protrusion height increases. The reason is that the control of the alignment of liquid crystals in the liquid crystal display in the present mode for carrying out the invention is carried out using a multiplicity of singular points formed in predetermined positions instead of the inclined surfaces of the grid-shaped structures 50 and 52. While liquid crystals in the vicinity of the middle of the protrusions must be sufficiently inclined through the application of a voltage in order to form singular points with stability, a sufficient angle of inclination can not be achieved when the protrusion height is too large. Therefore, as indicated by the present embodiment, the protrusions of the singular point control portions are only required to have a height at which singular points can be formed with stability and which may be much smaller than that of linear protrusions of conventional MVA LCDs.

FIG. 23 shows T-V characteristics of the liquid crystal display of the present embodiment. In FIG. 23, applied voltages (V) are plotted along the axis of abscissa, and transmittance (%) is plotted along the axis of ordinate. The cell thickness of the liquid crystal display in FIG. 23 is 3.8 μm. JALS-684 (manufactured by JSR) is used for the vertical alignment films, and MJ961213 (manufactured by Merck) are used as the liquid crystal material. The material used to form the grid-shaped structures 50 and 52 of the liquid crystal display of the present embodiment is LC200 (photoresist manufactured by Shipley Far East Corp.). The protruding height of the grid-shaped structures 50 and 52 is 1.1 μm. The height of the protrusions of the conventional MVA LCD shown for comparison is 1.6 μm.

In FIG. 23, the curves A, B and C indicate the liquid crystal display of the present embodiment. The curve A indicates a case in which the length of the gaps between the grid-shaped structures 50 and 52 is 30 μm□ (=30 μm×30 μm). The curve B indicates a case in which the length of the gaps between the grid-shaped structures 50 and 52 is 20 μm□. The curve C indicates a case in which the length of the gaps between the grid-shaped structures 50 and 52 is 10 μm□.

The curves D and E indicate a conventional MVA LCD. The curve D indicates a case in which linear protrusions are provided on upper and lower substrates and in which the length of the gaps between the protrusions is 25 μm. The curve E indicates a case in which slits and linear protrusions are respectively provided on an lower substrate and an upper substrate and in which the length of the gaps is 25 μm.

The liquid crystal display having a gap length of 20 μm□ indicated by the curve B in FIG. 23 can achieve transmittance similar to that of the conventional MVA LCD having a gap length of 25 μm indicated by the curves D and E. As indicated by the curve A in FIG. 23, transmittance of 26% or more can be achieved when the gap length is expanded to 40 μm□. That is, it is possible to achieve transmittance that is 1.3 times that of the conventional MVA LCD. Therefore, when it is not essential to increase response time by increasing the density of the structures, the liquid crystal display in the present mode for carrying out the invention can achieve transmittance higher than that of the conventional MVA LCD.

As indicated by the curve C in FIG. 23, transmittance of 15% or more can be achieved even with a gap length of 10 μm□. In this case, transmittance similar to that of the prior art can be achieved in spite of the fact that the density of the cross-grid structures 50 and 52 is about twice that of the conventional linear protrusions. This is considered to be an effect resulting from the fact that only one dark line (disclination line) is formed at the boundary of alignment separating regions, and it is apparent that the singular point control portions in the present mode for carrying out the invention are advantageous in increasing the density of the structures.

FIG. 24 shows response characteristics of the liquid crystal display of the present embodiment. Transmittance (%) is plotted along the axis of abscissa, and response time (Ton+Toff (ms)) is plotted along the axis of ordinate. The display operates in the normally black mode and provides transmittance of 0% and 100% when the applied voltage is 0 V and 5 V, respectively.

The curve A indicates a liquid crystal display according to the present embodiment in which the length of the gaps between the grid-shaped structures 50 and 52 is 10 μm□. The curve B indicates a conventional MVA LCD in which slits and linear protrusions are respectively provided on lower and upper substrates and in which the gap length is 25 μm. The curve C indicates a conventional LCD in which a rubbing process is provided on vertical alignment films.

As indicated by the curve A, the liquid crystal display having the grid-shaped structures 50 and 52 in a high density has halftone response time of 60 ms when transmittance is changed from 0% to 25% and then to 0%, which means an improvement of 33% from the conventional MVA LCD indicated by the curve B.

As indicated by the present embodiment, in a liquid crystal display in the present mode for carrying out the invention, response characteristics can be improved while avoiding any reduction of transmittance unlike the prior art. Further, transmittance can be improved with response characteristics kept similar to those in the prior art.

Further, as an additional feature, there is an advantage in that layout designing is very much facilitated when fine display regions are to be provided because the structures as shown in FIG. 21 are not required to be provided at an angle to the pixels and in that irregularities of alignment around pixels are less likely to occur compared to the prior art. Since the polarizing axes of the polarizers are in parallel with or orthogonal to the grid of grid-shaped structures, there is another advantage in that leakage of light from the inclined surfaces of the structures can be reduced in the state of black display.

[Embodiment 2]

FIG. 25 shows a structure of a liquid crystal display according to the present embodiment. FIG. 25 shows a section taken in a direction perpendicular to the substrate surface. It has a structure similar to that of Embodiment 1 shown in FIG. 21 when viewed in the direction of the substrate surface. Referring to singular point control portions in the present embodiment, protruding structures 34 as shown in FIG. 8 are used as elements for controlling the positions of first singular points, and linear protrusions 43 and 44 as shown in FIG. 16 are used as elements for controlling the positions of second singular points. As combinations of those elements for controlling the positions of singular points, structures 50 made of a conductor in the form of a cross-grid are formed on a lower substrate 20, and a cross-grid 52 made of a conductor having the same pitch as that of the grid pitch of the structures 50 is provided on an upper substrate 22 at an offset of one half of the grid pitch of the structures 50. For example, the structures 50 and 52 made of a conductor are formed by forming the structures using photoresist and by depositing ITO transparent electrodes on the surface of the structures thereafter.

Planarized layers 54 made of an insulator are formed in the gaps of the grid of the structures 50, and planarized layers 56 made of an insulator are formed in the gaps of the grid of the structure 52. This makes it possible to provide a slight difference between threshold voltages at the top of the structures 50 and 52 and the gaps in the structures 50 and 52. By applying a voltage at a predetermined value or less, a state can be achieved in which liquid crystal molecules 6 around the structures 50 and 52 are inclined and liquid crystal molecules 6 in the gaps are kept aligned vertically. That is, by applying a voltage equal to or less than the threshold voltage at the gaps in advance, liquid crystal alignment around the structures 50 and 52 can be biased in advance to form a singular point.

FIG. 26 shows response characteristics when the bias voltage is applied. Transmittance Y (%) is plotted along the axis of abscissa, and response time (ms) is plotted along the axis of ordinate. The display operates in the normally black mode and provides transmittance of 0% and 100% when the applied voltage is 4 V and 15 V, respectively. The structures 50 and 52 have a gap length of 10 $\mu$m☐ and a height of 1.3 $\mu$m. The thickness of the planarized layers 54 and 56 in the gaps is about 1 $\mu$m. The liquid crystals MJ98126 are used, and the material of the vertical alignment layers is JALS-684. Spacers for achieving a predetermined cell gap have a diameter of 3.0 $\mu$m.

The curve A indicates Toff response time. The curve B indicates Ton response time. The curve C indicates response time Ton+Toff. As shown in FIG. 26, excellent response characteristics are achieved in that halftone response time (Ton+Toff) is 25 ms when transmittance is changed from 0% to 25% (Ton) then from 25% to 0% (Toff).

[Embodiment 3]

FIG. 27 shows a liquid crystal display according to the present embodiment. FIG. 27 shows a state of the same as viewed in the direction of the normal line of the surface of a substrate. A cross-grid structure 50 made of a conductor which is similar to that in Embodiment 1 shown in FIG. 21 is formed on a lower substrate 20 as a singular point control portion. On an upper substrate 22, an alignment regulating member 58 is provided along an imaginary straight line connecting adjacent singular points, which is a feature in the form of a cross grid at an angle of 45 deg. to the grid of the structure 50.

As a result, when liquid crystal molecules 6 are aligned separately by means of control over singular points at the time of application of a voltage, the alignment regulating member 58 controls the alignment of liquid crystals such that the direction of longitudinal axes of liquid crystal molecules in liquid crystal domains adjacent to each other located on both sides of the alignment regulating member 58 are substantially at 90 deg. to the imaginary straight line. The alignment control achieved by the alignment control member is similar to the alignment control in the conventional MVA LCD shown in FIG. 44. It is thus possible to use a singular point control portion in the present mode for carrying out the invention in combination with a conventional alignment control member.

[Second Mode for Carrying Out the Invention]

A liquid crystal display in a second mode for carrying out the invention will now be described with reference to FIGS. 28 through 41. In the drawings used for explaining the present mode for carrying out the invention, components having the same functions as those of the components described with reference to drawings as the first mode for carrying out the invention and the prior art will be indicated by like reference numerals and will not be described.

FIG. 28 is a graph for explaining an after-image phenomenon that occurs in a conventional MVA LCD. Time (ms) is plotted along the axis of abscissa, and transmittance is plotted along the axis of ordinate. Changes in transmittance with time are shown where black is displayed from 0 to 1000 ms; white is displayed from 1000 to 2000 ms; and black is displayed from 2000 ms and later. As shown in FIG. 28, the conventional MVA LCD has an after-image phenomenon in which white becomes temporarily brighter at the time of a change from black and white in the normally black mode. Otherwise, a display defect occurs in that an after-image is generated because a liquid crystal domain is formed in different states when white is displayed after a change from black to white and when white is displayed after a change from a halftone to white.

Such an after-image phenomenon will now be described by referring to FIG. 44 again. The positions of singular points on the linear protrusions 126 through 130 for regulating alignment shown in FIG. 44 move on the linear protrusions 126 through 130 in depending on any changes in the distortion as a result of the application of a voltage. The movement of the singular points is visually recognized as an after-image because it causes a change in the direction of domain control.

In order to mitigate this problem, Japanese patent application No. H11-229249 introduced in the section of the first mode for carrying out the invention proposes to provide a singular point forming portion 150 for fixing a point at which the direction of alignment of the liquid crystal molecules 6 is discontinuous to a linear protrusion (or slit) 126 for alignment control provided on a pixel electrode in a display region (e.g., the electrode 122 provided on the lower substrate 118) or a singular point in an alignment vector field, as shown in FIGS. 29A through 29C. FIG. 29A shows a state in the vicinity of the singular point forming portion 150 as viewed in the direction of the normal line of the substrate surface. A singular point is fixedly formed on the singular point forming portion 150, and two dark lines 140 and 142 are formed on both sides of the linear protrusion 126. FIG. 29B shows a state of alignment of the liquid crystal molecules 6 in the vicinity of the singular point forming portion 150 as viewed in the direction of the normal line of the substrate surface. FIG. 29C shows a section taken in the direction perpendicular to the substrate surface, and the singular point forming portion 150 in the present example is provided in a predetermined position on the upper substrate 116 in a face-to-face relationship with the linear protrusion 126 provided on the lower substrate 118.

The inventors closely investigated the alignment of liquid crystals in an MVA type TFT LCD and found that singular points of an alignment vector field are formed around the pixel electrodes. FIGS. 30 and 31 show the results of observation.

FIG. 30 is a view of one pixel region and the neighborhood thereof taken on the MVA type TFT LCD shown in FIGS. 29A through 29C as viewed from the side of the upper substrate 116. A plurality of gate bus lines 154 to which a scan signal for selecting a display pixel to be driven is sequentially input are formed in parallel with each other on the lower substrate 118. An insulation film (not shown) is formed on the plurality of gate bus lines 154, and a plurality of data bus lines 152 are formed on the insulation film substantially orthogonally to the gate bus lines 154. Each of regions defined in the form of a matrix by the plurality of gate bus lines 154 and data bus lines 152 orthogonal to each other serves as a pixel region, and a TFT 158 and a pixel electrode 122 are formed in each pixel region. The gate electrode of a TFT 158 is connected to a predetermined gate bus line 154; the drain electrode is connected to a predetermined data bus line 152; and the source electrode is connected to the pixel electrode 122. A storage capacitor line 156 is formed in parallel with the gate bus line 154 such that it extends in the lateral direction of the figure under the pixel electrode 122 in the middle thereof.

The pixel electrode 122 is formed with non-electrode regions 126 in the form of slits. The non-electrode regions 126 are provided in a pattern in which they are aligned in a direction at an angle of 45 deg. to the gate bus lines 154 and data bus lines 152. The pixel electrode 122 is divided by the non-electrode regions 126 into a plurality of separate electrode regions. Conduction between the plurality of separate electrode regions is maintained by thin connection electrodes formed on the non-electrode regions 126.

While a black matrix as a shading film and a color filter are normally formed on the upper substrate 116, it is omitted in FIG. 30. On an opposite electrode 120 formed on the upper substrate 116, linear protrusions 130 are formed which are aligned in a direction at 45 deg. to the gate bus line 154 and data bus line 152 similarly to the pattern of the non-electrode regions 126 on the lower substrate 118. The linear protrusions 130 are provided at the same pitch as that of the non-electrode regions 126 and are provided at an offset that is equal to one half of the pitch relative to the non-electrode regions 126.

By applying a voltage for driving the TFT 158 to the data bus lines 152 and gate bus lines 154, a voltage is applied between the pixel electrode 122 and opposite electrode 120. At this time, diagonal electric fields generated in the vicinity of the non-electrode regions 126 and linear protrusions 130 regulate the alignment of liquid crystal molecules 6 in predetermined directions to separate the pixel electrode 122 into four alignment regions A, B, C and D. First singular points formed at this time are indicated by dots ● in the figure, and second singular points are indicated by circles ○. Two dark lines 140 and 142 generated on both sides of alignment regulating members (non-electrode regions 126 and linear protrusions 130) as described with reference to FIG. 44 are also shown. The two dark lines 140 and 142 are regions of the liquid crystal molecules 6 in directions of alignment that substantially coincide with the directions of the polarizing axes of the polarizers shown in the figure (the lateral and vertical directions of the figure).

FIG. 31 is a version of FIG. 30 in which the substrate structure is omitted to show only the first and second singular points, the aligned liquid crystal molecules 6 and the two dark lines 140 and 142.

It is apparent from FIGS. 30 and 31 that singular points in an alignment vector field are formed not only in the pixel electrode 122 but also around the pixel electrode 122. The singular points formed around the pixel electrode 122 are connected to the singular points inside the pixel region 122 by the dark lines 140 and 142. A dark line extending from a first (or second) singular point is connected to a second (or first) singular point.

A close study into singular points around the pixel electrode 122 has revealed the fact that they are not always formed in completely the same positions and that singular points are formed in positions which are slightly different at each response to change black to white or formed in positions which move as time passes after a response.

As described above, the singular points around and inside the pixel electrode 122 are connected to each other by the dark lines 140 and 142. Therefore, such changes in the singular points around the pixel electrode 122 can affect the direction of alignment of the liquid crystals inside the pixel electrode 122, in particular, in the vicinity of the edges of the pixel electrode 122. This results in the occurrence of a display defect similar to an after-image attributable to changes in singular points on the pixel electrode 122.

The inventors then studied causes of changes in singular points with a primary attention to the alignment of the liquid crystals around the pixel electrode 122. Distortion of electric fields occurs between the edges of the pixel electrode 122 and the opposite electrode 120 and between the bus lines 152 and 154 and the opposite electrode 120, and such distortion of electric fields regulates the direction of alignment of the liquid crystal molecules 6.

FIGS. 32A and 32B are illustrations of distortion of electric fields at the edges of the pixel electrode 122. FIG. 32A shows a state of the pixel electrode 122 as viewed from the side of the upper substrate 116, and FIG. 32B shows a section taken along line A—A in FIG. 32A. Distortion of an electric field at an edge 160 of the pixel electrode 122 directs the liquid crystal molecules 6 toward the inside of the pixel electrode 122 according to an electric line of force α indicated by a broken line in FIG. 32B.

FIGS. 33A and 33B are illustrations of distortion of electric fields at edges of the bus lines 152 and 154. FIG. 33A shows a state of the bus lines 152 and 154 as viewed from the side of the upper substrate 116, and FIG. 33B shows a section taken along line A—A in FIG. 33A. As shown in FIGS. 33A and 33B, distortion of an electric field at edges 162 of the bus lines 152 and 154 directs the liquid crystal molecules 6 toward the inside of the bus lines 152 and 154.

FIG. 34 shows a state of alignment of the liquid crystal molecules in the vicinity of the bus lines 152 and 154 between adjoining pixel electrodes 122. As shown in FIG. 34, the liquid crystal molecules 6 between edges 160 of the pixel electrodes 122 and aligned in a direction that is 180 deg. deferent from the direction of alignment between edges 162 of the bus lines 152 and 154. Since the state of alignment of the liquid crystals continuously changes from the sate at the edges 160 of the pixel electrodes 122 to the state at the edges of 162 of the bus lines 152 and 154, some liquid crystal molecules 6' are aligned in a direction 90 deg. different from the direction of alignment at the edges 162 of the bus lines 152 and 154 and the edges 160 of the pixel electrodes 122 in the transition of alignment. However, no particular means is provided for limiting the direction of alignment of such liquid crystal molecules 6' to either of upward and downward directions in FIG. 34.

Further, some liquid crystal molecules 6" on the bus lines 152 and 154 in the middle thereof are aligned in a direction 90 deg. different from the direction of alignment at the edges 162 of the bus lines 152 and 154. While the liquid crystal molecules 6" in the middle of the bus lines 152 and 154 are aligned in parallel with the extending direction of the bus lines 152 and 154, no particular means is provided for limiting the direction of alignment to either of upward and downward directions in FIG. 34.

As thus described, the liquid crystal molecules 6 around the pixel electrodes 122 are temporarily aligned at random upward or downward directions when the voltage is applied and are thereafter settled in an ultimate direction of alignment under external influences such as the alignment of liquid crystals in the pixel electrodes 122 to consequently form singular points as shown in FIG. 30. That is, since there is no means for definitely fixing the position of formation of singular points around the pixel electrodes 122, it takes time for the liquid crystal domain around the pixel electrodes 122 to settle in an ultimate direction of alignment, which results in a display defect in the form of an after-image. It is an object of the present mode for carrying out the invention to achieve stable alignment of an MVA-type TFT LCD and to mitigate any display defect.

A description will now be made with reference to FIG. 35 on a principle for achieving stable alignment in a liquid crystal display in the present mode for carrying out the invention. FIG. 35 shows a state in which singular points formed around the pixel electrodes 122 are fixed in regions between the edges 160 of the pixel electrodes 122 and the edges of the bus lines 152 and 154 and regions on the bus lines 152 and 154. In the figure, first singular points are indicated by dots ●, and second singular points are indicated by circles ○. By fixing the positions of singular points as shown in FIG. 35, the positions of singular points formed around the pixel electrodes 122 will not vary each time a voltage is applied for display response or as time passes, it is possible to improve display quality by controlling the alignment of liquid crystal molecules with stability.

The result of observation of the state of a substrate shown in FIG. 30 indicates that first singular points and second singular points are alternately aligned in the alignment of liquid crystals. Therefore, by providing the singular point forming portions such that first singular points and second singular points are alternately formed on the substrate as shown in FIG. 35, the singular points formed can be controlled such that they are located in constant positions with stability.

The result of observation of the state of a substrate shown in FIG. 30 is characterized by the fact that the first singular points are formed in regions where the structures or the non-electrode regions in the form of slits as singular point forming portions intersect with the edges of the pixel electrodes and that second singular points are formed in regions where the structures or non-electrode regions in the form of slits provided on one of the substrates intersect with the edges of the pixel electrodes on the other substrate. Therefore, when the singular point forming portions are provided in accordance with such a characteristic, singular points formed thereby can be controlled in constant positions with stability.

A more specific description will now be made with reference to preferred embodiments.

[Embodiment 1]

FIG. 36 shows Embodiment 1 in the present mode for carrying out the invention. A singular point forming portion in the present embodiment has regions formed by locally changing the width of bus lines 152 and 154. As shown in FIG. 36, a narrow region 60 and a wide region 62 are formed adjacent to each other with a region having a normal width interposed therebetween. While the normal width of the bus lines is 10 $\mu$m, the narrow region 60 and wide region 62 are 5 $\mu$m and 15 $\mu$m, respectively. The lengths of the narrow region 60 and wide region 62 in the extending direction of the bus lines 152 and 154 are both 10 $\mu$m.

A vertical alignment film 2 is applied to a lower substrate 118 on which the bus lines 152 and 154 formed with such narrow region 60 and wide region 62 of the singular point forming portion. The lower substrate is combined with an upper substrate 116 having a vertical alignment film 4 similarly applied thereto. Then, liquid crystals are injected. As the vertical alignment films 2 and 4, JALS-684 (manufactured by JSR) is used and applied to the substrates 116 and 118 through a printing process. Thereafter, a heating process is carried out for about one hour at about 180° C. MJ961213 (manufactured by Merck) is used as the liquid crystal material and are injected between the two substrates through a vacuum injection process. The cell gap is 4 $\mu$m.

In the liquid crystal panel thus formed, when a voltage is applied, second singular points (s=−1) are formed in the narrow region 60, and first singular points (s=+1) are formed in the wide region 62. This makes it possible to fix singular points formed on the bus lines 152 and 154 around the pixel electrode 122 in predetermined positions. It is therefore possible to eliminate phenomena that are related to display defects such as variations of the state of formation of singular points observed at the time of a response of conventional liquid crystal displays and fluctuations of singular points as time passes after a response.

[Embodiment 2]

Figure 37A:
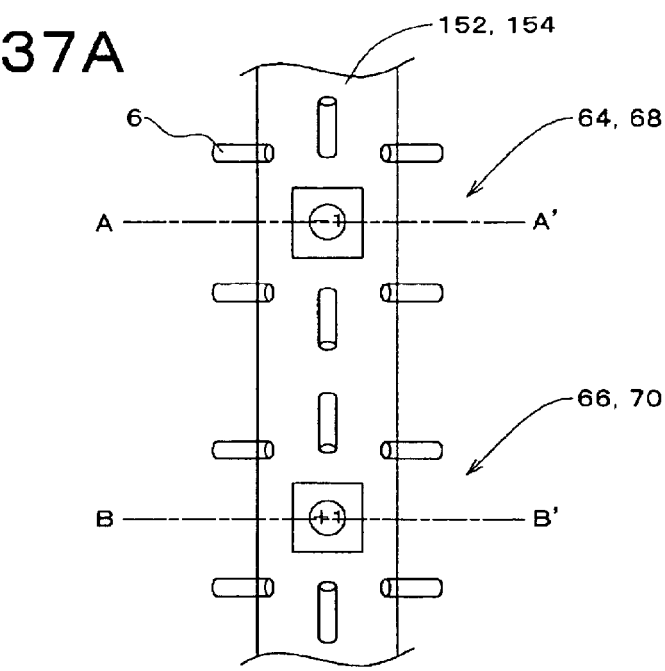
Figure 37B:
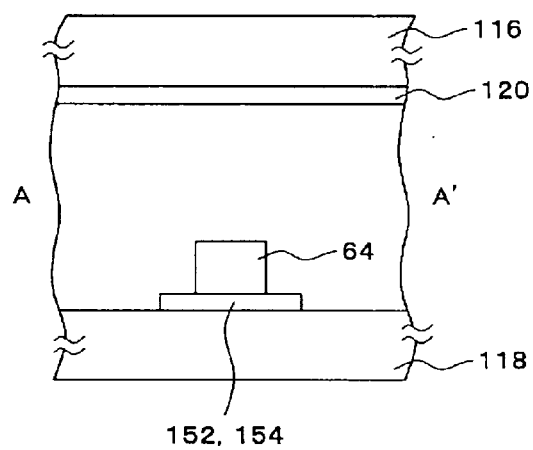
Figure 37D:
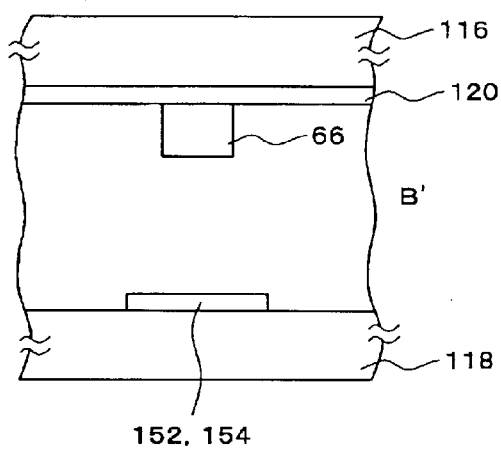
Figure 37C:
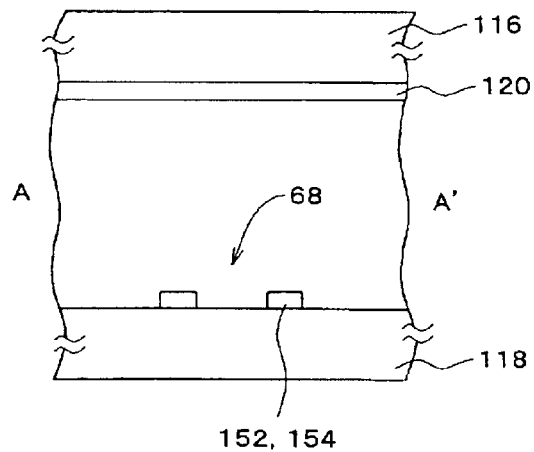
Figure 37E:
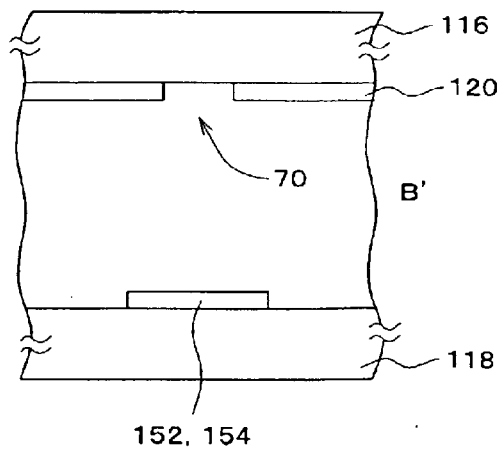

Embodiment 2 will now be described with reference to FIGS. 37A through 37E. FIG. 37A shows a state of the bus lines 152 and 154 as viewed in the direction of the normal line of the substrate surface. FIG. 37B shows an example of a section taken along line A—A in FIG. 37A, and FIG. 37C shows another example of the same. FIG. 37D shows an example of a section taken along line B—B in FIG. 37A, and FIG. 37E shows another example of the same.

The present embodiment is characterized in that there is provided structures or blank regions on the bus lines 152 and 154 or on the opposite substrate directly above the bus lines 152 and 154 instead of the singular point forming portion described in Embodiment 1 in which the width of the bus lines is varied. The bus line width is 10 $\mu$m. In FIG. 37B, protruding structures 64 are formed on the bus lines 152 and 154 to form and fix second singular points. The width and length of the protruding structures 64 are both 5 $\mu$m, and the height of the structures is 1.5 $\mu$m. The material used for forming the protruding structures 64 is PC-335 (manufactured by JSR), and the structures are selectively formed on the bus lines 152 and 154 using a photolithographic process.

Referring to FIG. 37C, instead of the protruding structures 64, blank regions 68 are formed in the bus lines 152 and 154 by removing the metal that makes up the bus lines 152 and 154 to configure singular points forming portions for forming and fixing second singular points. The width and length of the blank regions 68 are both 5 $\mu$m.

Referring to FIG. 37D, protruding structures 68 are formed on the opposite electrode 116 directly above the bus lines 152 and 154 to form and fix first singular points. The width and length of the protruding structures 68 are both 5 $\mu$m, and the height of the structures is 1.5 $\mu$m. The material used for forming the protruding structures 68 is PC-335 (manufactured by JSR), and the structures are selectively formed on the opposite electrode 120 using a photolithographic process.

Referring to FIG. 37E, instead of the protruding structures 68, non-electrode regions 70 where the material that makes up the opposite electrode 120 is not formed are formed in the opposite electrodes 120 to configure singular point forming portions. The width and length of the non-electrode regions 70 are both 5 µm.

In the liquid crystal panel thus formed, when a voltage is applied, second singular points (s=−1) are formed at the protruding structures 64 or blank regions 68, and first singular points (s=+1) are formed at the protruding structures 66 or non-electrode regions 70. This makes it possible to fix singular points formed on the bus lines 152 and 154 around the pixel electrode 122 in predetermined positions. It is therefore possible to eliminate phenomena that are related to display defects such as variations of the state of formation of singular points observed at the time of a response of conventional liquid crystal displays and fluctuations of singular points as time passes after a response.

[Embodiment 3]

Embodiment 3 will now be described with reference to FIG. 38. A singular point forming portion in the present embodiment is configured by arranging a narrow region 60 formed by reducing the width of bus lines 152 and 154 and a non-electrode region 126 in the form of a slit formed at an edge 160 of a pixel electrode 122 as shown in FIG. 30 and so on such that they are adjacent to each other as viewed in the direction of the normal line of the substrate surface. While the bus line width is normally 10 µm, the width of the narrow region 60 is 5 µm, and the length of the narrow region 60 in the extending direction of the bus lines 152 and 154 is 10 µm.

Second singular points are formed on the bus lines 152 and 154 similarly to Embodiment 1, and first singular points are formed in the regions between the bus lines 152 and 154 and the edges 160 of the pixel electrodes 122. Like Embodiments 1 and 2, this also makes it possible to eliminate phenomena that are related to display defects such as variations of the state of formation of singular points observed at the time of a response of conventional liquid crystal displays and fluctuations of singular points as time passes after a response.

[Embodiment 4]

Embodiment 4 will now be described with reference to FIG. 39. In a singular point forming portion according to the present embodiment, a wide region 62 formed by expanding the width of bus lines 152 and 154 and a linear protrusion 130 formed on an opposite electrode 120 on the opposite substrate 116 as shown in FIG. 30 and so on are provided such that they intersect with each other as viewed in the direction of the normal line of the substrate surface. While the bus line width is normally 10 µm, the width of the wide region 62 is 15 µm, and the length of the wide region 60 in the extending direction of the bus lines 152 and 154 is 10 µm.

First singular points are formed on the bus lines 152 and 154 similarly to Embodiment 1, and second singular points are formed in the regions between the bus lines 152 and 154 and the edges 160 of the pixel electrodes 122. Like Embodiments 1 through 3, this also makes it possible to eliminate phenomena that are related to display defects such as variations of the state of formation of singular points observed at the time of a response of conventional liquid crystal displays and fluctuations of singular points as time passes after a response.

[Embodiment 5]

Embodiment 5 will now be described with reference to FIG. 40. FIG. 40 shows an example in which singular points forming portions in the present mode for carrying out the invention are used in a circuit configuration similar to that of the conventional MVA-type TFT LCD shown in FIG. 30. Specifically, singular point forming portions as described with reference to FIG. 38 are provided at intersections between non-electrode regions 126 in the vicinity of edges 160 of pixel electrodes 122 and bus lines 152 and 154 to form first singular points (indicated by dots ● in the figure) fixedly and to form second singular points (indicated by circles ○) on the bus lines 152 and 154 fixedly.

Further, singular point forming portions as described with reference to FIG. 39 are formed at intersections between the bus lines 152 and 154 and linear protrusions 130 formed on the opposite substrate to form second singular points in regions between the edges 160 and the bus lines 152 and 154 fixedly and to form first singular point on the bus lines 152 and 154 fixedly.

As a result, first and second singular points are alternately and fixedly formed around the pixel electrodes 122 and, therefore, the positions of singular points around the pixel electrodes 122 can be controlled with improved stability. In the present embodiment, an XGA (the number of pixels: 1024×768) MVA-type TFT LCD having a display region of 15 inches in the diagonal direction was fabricated. The area of one pixel is 99 (µm)×297 (µm).

[Embodiment 6]

Embodiment 6 will now be described with reference to FIG. 41. The present embodiment is characterized in that singular point control portions used in the method for controlling separation of alignment in the first mode for carrying out the invention is used in combination. FIG. 41 shows one pixel region and the neighborhood thereof of an MVA-type TFT LCD according to the present embodiment as viewed from the side of an upper substrate 116.

A plurality of gate bus lines 154 to which a scan signal for selecting a display pixel to be driven is sequentially input are formed in parallel with each other on the lower substrate 118. An insulation film (not shown) is formed on the plurality of gate bus lines 154, and a plurality of data bus lines 152 are formed on the insulation film substantially orthogonally to the gate bus lines 154.

Each of regions defined in the form of a matrix by the plurality of gate bus lines 154 and data bus lines 152 orthogonal to each other serves as a pixel region, and a TFT 158 and a pixel electrode 122 are formed in each pixel region. The gate electrode of a TFT 158 is connected to a predetermined gate bus line 154; the drain electrode is connected to a predetermined data bus line 152; and the source electrode is connected to the pixel electrode 122. A storage capacitor line 156 is formed in parallel with the gate bus line 154 such that it extends in the lateral direction of the figure under the pixel electrode 122 in the middle thereof. Above the storage capacitor line 156, there is formed a storage capacitor electrode 164 which is connected to the pixel electrode 122 through an insulation film.

The pixel electrode 122 is formed with four non-electrode regions 72 in the form of slits. The four non-electrode regions 72 are formed in parallel with the gate bus lines 154, and two each of them are paired and arranged in a row such that they face each other at one end thereof with a predetermined gap therebetween. Two pairs of non-electrode regions 72 are disposed at equal intervals such that they separate the pixel electrode 122 into three equal parts in the vertical direction of the figure. That is, the two pairs of non-electrode regions 72 have the same function as that of the elements for controlling the positions of singular points shown in FIG. 14, and second singular points are formed in the middle of a pair of the non-electrode regions 72 as viewed in the direction of the normal line of the substrate surface.

FIG. 41 does not show a color filter and a black matrix formed on the upper substrate 116. A structure 74 in the form of a cross-grid made of an insulator is formed on an opposite electrode 120 formed on the upper substrate 116. The cross-shaped grid is provided in parallel with or perpendicularly to the gate bus lines 154 and data bus lines 152. The structure 74 in the form of a cross-grid acts similarly to the element for controlling the positions of singular points shown in FIG. 8, and first singular points are formed in the middle of the crosses of the structure 74 as viewed in the direction of the normal line of the substrate surface. The structure 74 is provided such that it divides the pixel region 122 into twelve substantially equal parts in combination with the non-electrode regions 72.

When a voltage is applied between the pixel electrode 122 and the opposite electrode 120, the alignment of liquid crystal molecules 6 is regulated in predetermined directions as a result of an action of diagonal electric fields that are generated in the vicinity of the non-electrode regions 72 and the structure 74 in the form of a cross-grid. As a result, separation of alignment occurs to divide the pixel region 122 into four alignment regions A, B, C and D. First singular points formed at this time are indicated by dots ● in the figure, and second singular points are indicated by circles ○.

Singular point forming portions as described with reference to FIG. 38 are provided at intersections between the non-electrode regions 72 and the bus lines 152 and 154 in the vicinity of edges 160 of the pixel electrodes 122 to form first singular points in regions between the edges 160 and the bus lines 152 and 154 fixedly and to form second singular points on the bus lines 152 and 154 fixedly.

Singular point forming portions as described with reference to FIG. 39 are provided at intersections between the bus lines 152 and 154 and the structure 74 in the form of a cross-grid formed on the opposite substrate to form second singular points in regions between the edges 160 and the bus lines 152 and 154 fixedly and to form first singular points on the bus lines 152 and 154 fixedly.

Since this makes it possible to alternately and fixedly form first and second singular points inside and around the pixel electrodes 122, the positions of singular points around the pixel electrodes 122 can be controlled with improved stability.

The present embodiment also results in only one dark line 12 in each of the structure 74 in the form of a cross-grid and the non-electrode region 72 that constitute a singular point forming portion. This makes it possible not only to achieve a quite stable and preferable state of alignment compared to that of conventional MVA LCDs but also to prevent any reduction of transmittance even when response characteristics of liquid crystals are improved by reducing the grid pitch to increase the density of the structures beyond that of conventional linear protrusions for regulating alignment. Further, since the structure is not required to be disposed at an angle to the pixels, layout designing to achieve finer display regions is much facilitated. Since the polarizing axes of the polarizers are in parallel with or perpendicular to the grid of the grid-shaped structure as illustrated, there is another advantage in that leakage of light from the inclined surfaces of the structure can be avoided when black is displayed.

As described above, the present mode for carrying out the invention makes it possible to make the alignment of liquid crystals in an MVA-type TFT LCD stable, thereby improving the display performance of the same.

The present invention is not limited to the above-described modes of implementation, and various modifications of the invention are possible.

For example, while the above-described modes for carrying out the invention have referred to TFT LCDs as an example, the invention is not limited thereto and may be applied to LCDs that employ MIMs as a switching device, simple matrix type LCDs and plasma address type LCDs. Briefly, the invention can be applied to any display which display information as a result of application of voltage to a liquid crystal layer between electrodes opposite to each other.

As described above, the present invention makes it possible to improve response characteristics of an MVA LCD while suppressing any reduction in transmittance. The present invention also makes it possible to provide an MVA LCD having improved transmittance.

What is claimed is:

1. A liquid crystal display, comprising:

two substrates facing each other with a predetermined gap therebetween;

an electrode formed on each surface of the two substrates facing each other;

vertical alignment films formed on the electrodes;

liquid crystals having negative dielectric anisotropy sealed in the gap;

a singular point control portion for performing control such that a singular point of a director of the liquid crystals is formed in a predetermined position above or below said portion when a voltage is applied between the electrodes; and two polarizers whose polarizing axes are orthogonal to each other provided on an outer surface of each of the two substrates, wherein the singular point control portion forms the singular point when a voltage is applied so as to increase the ratio of the area of a liquid crystal domain in which the direction of longitudinal axes of molecules of the liquid crystals in the vicinity of the singular point control portion is substantially at an angle of 45 deg. to the polarizing axes of the polarizers as viewed in the normal direction of the surfaces of the substrates, wherein the singular point control portion forms a first singular point where the longitudinal axes of the liquid crystal molecules are directed toward substantially the same point and a second singular point where a part of the liquid crystal molecules are directed in a different direction adjacent to each other and controls the alignment of the liquid crystals such that the longitudinal axes of the liquid crystal molecules in liquid crystal domains located adjacent to each other on both sides of an imaginary straight line connecting the adjacent first and second singular points are substantially at 45 deg. to the imaginary straight line when a voltage is applied, and wherein one dark line is formed substantially along the imaginary straight line between a plurality of the singular point control portions when a voltage is applied.

2. A liquid crystal display according to claim 1, wherein the singular point control portion suppresses any expansion of the width of the dark line by causing distortion of a distribution of an electric field in a direction that is at least orthogonal to the imaginary straight line between the singular point control portions when a voltage is applied.

3. A liquid crystal display, comprising:

two substrates facing each other with a predetermined gap therebetween;

an electrode formed on each surface of the two substrates facing each other;

vertical alignment films formed on the electrodes;

liquid crystals having negative dielectric anisotropy sealed in the gap;

a singular point control portion for performing control such that a singular point of a director of the liquid crystals is formed in a predetermined position above or below said portion when a voltage is applied between the electrodes; and a protrusion formed on at least either of the electrodes at the singular point control portions and/or along an imaginary straight line between a plurality of the singular points adjacent to each other, wherein liquid crystal molecules on the protrusion are inclined substantially about the singular points when a voltage is applied.

4. A liquid crystal display, comprising:

two substrates facing each other with a predetermined gap therebetween;

an electrode formed on each surface of the two substrates facing each other;

vertical alignment films formed on the electrodes;

liquid crystals having negative dielectric anisotropy sealed in the gap;

a singular point control portion for performing control such that a singular point of a director of the liquid crystals is formed in a predetermined position above or below said portion when a voltage is applied between the electrodes; and an alignment regulating member provided substantially in parallel with the imaginary straight line connecting the singular points adjacent to each other and wherein an alignment of the liquid crystals is controlled such that the direction of longitudinal axes of the liquid crystal molecules in liquid crystal domains located adjacent to each other on both sides of the alignment regulating member are substantially at 90 deg. to the imaginary straight line when a voltage is applied.

5. A liquid crystal display, comprising:

two substrates facing each other with a predetermined gap therebetween;

a pixel electrode formed on either of the substrates;

an opposite electrode formed on the other substrate in a face-to-face relationship with the pixel electrode;

vertical alignment films formed on the pixel electrode and the opposite electrode;

liquid crystals having negative dielectric anisotropy sealed in the gap; and a singular point control portion for performing control such that a singular point of a director of the liquid crystals is formed in a predetermined position above or below said portion and around the pixel electrode, wherein the singular point control portion forms the singular point in a gap between the pixel electrode and the bus line.

6. Liquid crystal display according to claim 5, wherein the singular point control portion forms a first singular point where the direction of longitudinal axes of liquid crystal molecules are substantially directed toward the same point and a second singular point where a part of liquid crystal molecules are directed in a different direction.

* * * * *

UNITED STATES PATENT AND TRADEMARK OFFICE
CERTIFICATE OF CORRECTION

PATENT NO. : 6,930,739 B2
DATED : August 16, 2005
INVENTOR(S) : Arihiro Takeda

It is certified that error appears in the above-identified patent and that said Letters Patent is hereby corrected as shown below:

<u>Title page,</u>
Item [54], Title, delete "DEVICE" and insert -- DISPLAY --.

Signed and Sealed this

Eighteenth Day of April, 2006

JON W. DUDAS
*Director of the United States Patent and Trademark Office*